US012732286B2

(12) United States Patent
Tsai et al.

(10) Patent No.: US 12,732,286 B2
(45) **Date of Patent: *Sep. 8, 2026**

(54) WIRELESS CIRCUITRY WITH RECONFIGURABLE SIGNAL COUPLER

(71) Applicant: Apple Inc., Cupertino, CA (US)

(72) Inventors: Ming-Da Tsai, San Jose, CA (US); Haowei Jiang, San Diego, CA (US); Xiaoqiang Li, San Diego, CA (US); Zhengan Yang, Del Mar, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/826,796

(22) Filed: Sep. 6, 2024

(65) Prior Publication Data

US 2026/0074806 A1 Mar. 12, 2026

(51) Int. Cl.

| | |
|---|---|
| ***H04B 17/14*** | (2015.01) |
| ***H04B 1/401*** | (2015.01) |
| ***H04B 1/48*** | (2006.01) |
| ***H04B 3/46*** | (2015.01) |

(52) U.S. Cl.

CPC ............. *H04B 17/14* (2015.01); *H04B 1/401* (2013.01); *H04B 1/48* (2013.01); *H04B 3/46* (2013.01)

(58) Field of Classification Search

CPC .......... H04B 17/14; H04B 1/401; H04B 1/48; H04B 3/46

USPC .................................................. 375/295–297

See application file for complete search history.

(56) References Cited

U.S. PATENT DOCUMENTS

| | | | |
|---|---|---|---|
| 9,755,670 B2 | 9/2017 | Chen et al. | |
| 9,947,985 B2 | 4/2018 | Solomko et al. | |
| 10,181,823 B1 | 1/2019 | Cheng et al. | |
| 10,879,579 B2 | 12/2020 | Zhang et al. | |
| 11,888,504 B2 | 1/2024 | Calderin et al. | |
| 2006/0222104 A1* | 10/2006 | Braithwaite | H03F 1/3235 375/297 |

(Continued)

FOREIGN PATENT DOCUMENTS

KR 20220163283 A 12/2022

OTHER PUBLICATIONS

U.S. Appl. No. 18/826,859, filed Sep. 6, 2024, Ming-Da Tsai.*

(Continued)

*Primary Examiner* — Emmanuel Bayard

(74) *Attorney, Agent, or Firm* — Treyz Law Group, P.C.; Michael H. Lyons

(57) ABSTRACT

An electronic device may include transmit path that carries a signal. A reconfigurable signal coupler may be disposed on the transmit path and may include a signal path and a coupled path. Measurement circuitry may use the signal coupler to measure power of the signal. The signal path may be formed from at least a first winding in a first metallization layer. The coupled path may be formed from at least a second winding in a second metallization layer, a third winding in a third metallization layer, and a stack of additional windings surrounded by the first, second, and third windings. The signal coupler may include first and second conductors and a switch between the first and second conductors. Control circuitry may adjust switches in the signal coupler to switch between using the first and second conductors or only the second conductor in the coupled path.

20 Claims, 13 Drawing Sheets

(56) References Cited

U.S. PATENT DOCUMENTS

| | | | | |
|---|---|---|---|---|
| 2011/0080057 | A1* | 4/2011 | Bowman | H01R 13/6683 439/578 |
| 2016/0172740 | A1* | 6/2016 | Srirattana | H01P 5/185 333/101 |
| 2017/0077967 | A1* | 3/2017 | Srirattana | H04B 1/0057 |
| 2020/0313711 | A1* | 10/2020 | Patton | H04B 17/103 |
| 2023/0396285 | A1 | 12/2023 | Calderin et al. | |

OTHER PUBLICATIONS

Long Wang et al., "A 2.9-8.4-GHz Reconfigurable 90° Coupler With Compact Size in 0.13-μm SiGe BiCMOS", IEEE Microwave and Wireless Technology Letters, Mar. 2024, pp. 283-286, vol. 34, No. 3, IEEE.
Ting-Yueh Chin et al., "A 24-GHz CMOS Butler Matrix MMIC for Multi-Beam Smart Antenna Systems", IEEE Radio Frequency Integrated Circuits Symposium, 2008, pp. 633-636, IEEE.
Fei Wang et al., "A Broadband Compact Low-Loss 4x4 Butler Matrix in CMOS with Stacked Transformer Based Quadrature Couplers", 2016, pp. 1-4, IEEE.
David Munzer et al., "A Single-Ended Coupler-Based VSWR Resilient Joint mm-Wave True Power Detector and Impedance Sensor", IEEE Microwave and Wireless Components Letter, Jun. 2021, pp. 812-815, vol. 31, No. 6, IEEE.
Chia-Chan Chang et al., "Novel Design of a 2.5-GHz Fully Integrated CMOS Butler Matrix for Smart-Antenna Systems", IEEE Transactions on Microwave Theory and Techniques, Aug. 2008, pp. 1757-1763, vol. 56, No. 8, IEEE.
Alexander Alt et al., "Concept for the Implementation of Very High Directivity and Decade Bandwidth in Compact Microstrip Directional Couplers", Proceedings of the 46th European Microwave Conference, 2016, pp. 210-213, EuMA.
U.S. Appl. No. 18/454,708, filed Aug. 23, 2023.
U.S. Appl. No. 18/470,581, filed Sep. 20, 2023.

* cited by examiner

WIRELESS CIRCUITRY WITH RECONFIGURABLE SIGNAL COUPLER

FIELD

This disclosure relates generally to electronic devices, including electronic devices with circuitry for transmitting radio-frequency signals.

BACKGROUND

Electronic devices are often provided with signal transmission capabilities in which a signal is transmitted onto an output load. Electronic devices with signal transmission capabilities include wireless electronic devices having a wireless transmitter that transmits radio-frequency signals onto an output load such as an antenna.

It is often desirable to be able to measure one or more characteristics of the output load by measuring the power of the transmitted signal at the output load. If care is not taken, circuitry for measuring the power of the transmitted signal can occupy an excessive amount of space in the device, can produce undesirable loss to the transmitted signal, can exhibit insufficient accuracy, and/or can exhibit insufficient dynamic range.

SUMMARY

An electronic device may include a transmit path coupled between an input node and an output node. A signal source may produce a signal at the input node of the transmit path. A reconfigurable signal coupler may be disposed on the transmit path. The reconfigurable signal coupler may include a signal path and a coupled path coextensive with the signal path. Measurement circuitry may be coupled to a coupled node of the reconfigurable signal coupler. The measurement circuitry may use the reconfigurable signal coupler to measure power of the signal on the transmit path.

The signal path may be formed from at least a first winding in a first metallization layer of a substrate. The coupled path may be formed from at least a second winding in a second metallization layer and overlapping the first winding, a third winding in a third metallization layer and overlapping the first and second windings, and a stack of additional windings surrounded by the first, second, and third windings. The second winding, the third winding, and the stack of additional windings may be coupled in series. This may increase the amount of coupling between the signal path and the coupled path while minimizing a footprint of the reconfigurable signal coupler on the substrate.

The coupled path may include a first conductor, a second conductor, and a first switch that couples the first conductor to the second conductor. In some implementations, a second switch may couple the first and second conductors to the coupled node and a third switch may couple the second conductor to first and second impedance terminations. In other embodiments, the first conductor may be coupled in series between the first impedance termination and the first switch. A third switch may couple a second impedance termination to the second conductor, which is coupled in series between the coupled node and both the first switch and the third switch. Control circuitry may adjust the switches to adjust the reconfigurable signal coupler between a high coupling mode in which both the first and second conductors form the coupled path and a low coupling mode in which only the second conductor forms the coupled path.

DETAILED DESCRIPTION

Figure 1:
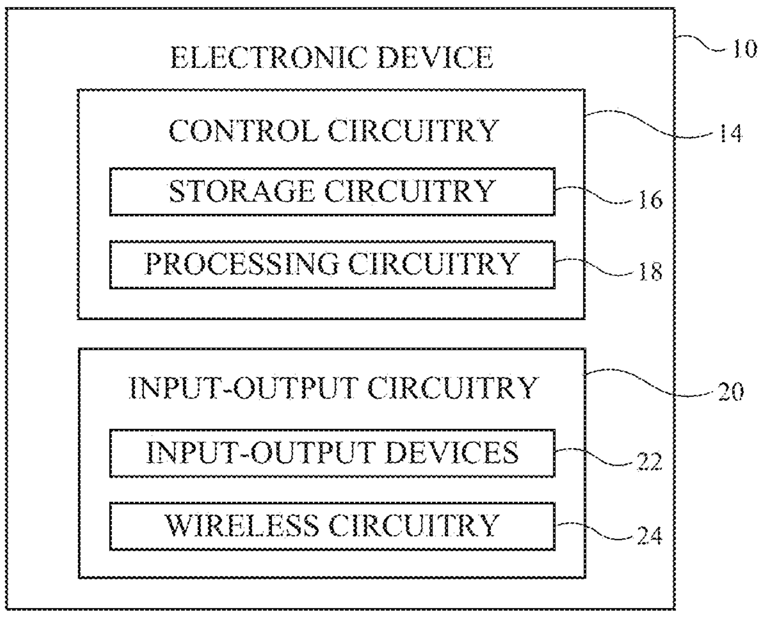
FIG. 1 is a schematic diagram of an illustrative electronic device having wireless circuitry in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, a helmet, or other equipment worn on a user's head (e.g., an augmented, virtual, or mixed reality head-mounted display device), or another wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the schematic diagram FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas. Wireless circuitry 24 may also include baseband processor circuitry, transceiver circuitry, amplifier circuitry, filter circuitry, switching circuitry, radio-frequency transmission lines, radio-frequency front end circuitry, and/or any other circuitry for transmitting and/or receiving radio-frequency signals using the antenna(s).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), a Wi-Fi® 7 band, and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, sub-THz frequency bands between around 100 GHz and 10 THz (e.g., 6G bands), near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Figure 2:
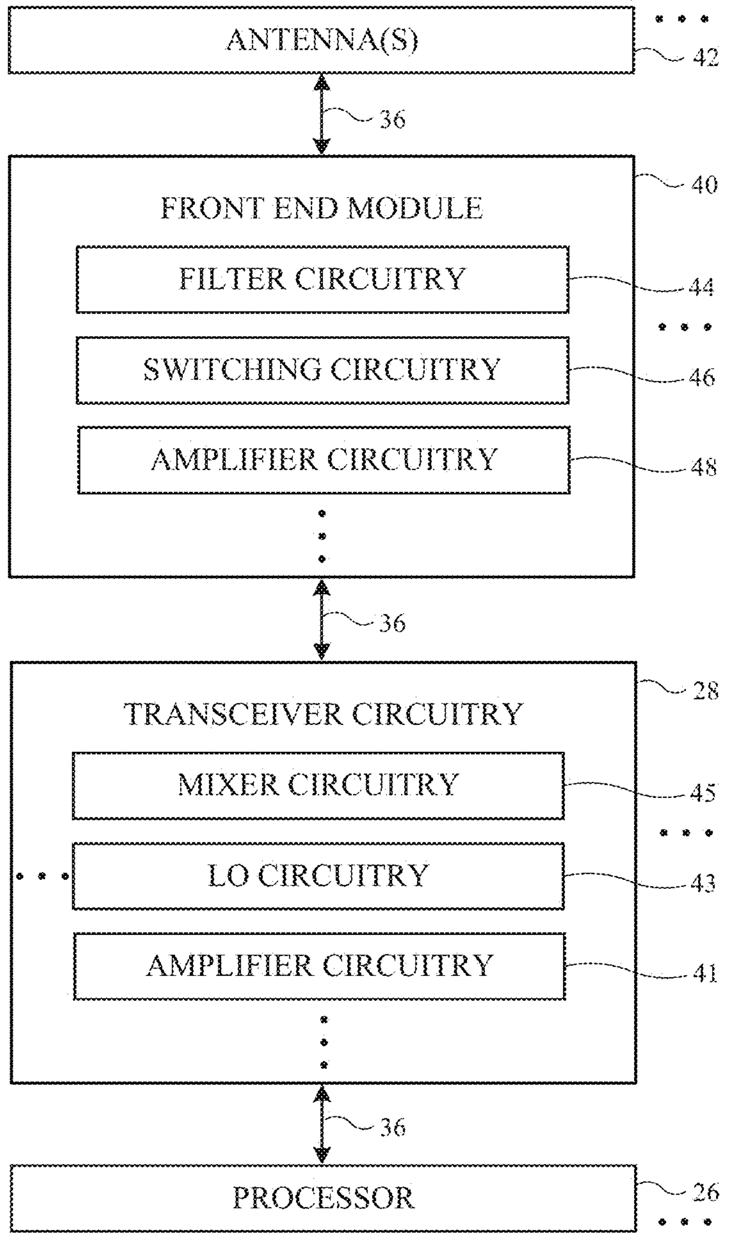
FIG. 2 is a schematic diagram of illustrative wireless circuitry in accordance with some embodiments.

FIG. 2 is a diagram showing illustrative components within wireless circuitry 24. As shown in FIG. 2, wireless circuitry 24 may include one or more processors such as processor(s) 26, radio-frequency (RF) transceiver circuitry such as radio-frequency transceiver 28, radio-frequency front end circuitry such as radio-frequency front end module (FEM) 40, and antenna(s) 42. Processor 26 may include baseband circuitry (e.g., one or more baseband processors), an application processor, a digital signal processor, a microcontroller, a microprocessor, a central processing unit (CPU), a programmable device, an a combination of these circuits, and/or one or more processors within processing circuitry 18 of FIG. 1. Processor 26 may be configured to generate digital (transmit or baseband) signals. Processor 26 may be coupled to transceiver 28 over path 34 (sometimes referred to as a baseband path). Transceiver 28 may be coupled to antenna 42 via radio-frequency transmission line path 36. If desired, one or more radio-frequency front end modules such as radio-frequency front end module 40 may be disposed along radio-frequency transmission line path 36 between transceiver 28 and antenna 42.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna (IFA) structures, slot antenna structures, planar inverted-F antenna (PIFA) structures, helical antenna structures, monopole antennas, dipoles, dielectric resonator antenna (DRA) structures, waveguide antenna structures, bowtie antenna structures, hybrids of these designs, etc. If desired, two or more antennas 42 may be arranged into one or more phased antenna arrays (e.g., for conveying radio-frequency signals at millimeter wave frequencies). If desired, parasitic elements may be included in antenna 42 to adjust antenna performance. If desired, antenna 42 may be provided with a conductive cavity that backs the antenna resonating element of antenna 42 (e.g., antenna 42 may be a cavity-backed antenna such as a cavity-backed slot antenna).

In the example of FIG. 2, wireless circuitry 24 is illustrated as including only a single processor 26, a single transceiver 28, a single front end module 40, and a single antenna 42 for the sake of clarity. In general, wireless circuitry 24 may include any desired number of processors 26, any desired number of transceivers 28, any desired number of front end modules 40, and any desired number of antennas 42. Each processor 26 may be coupled to one or more transceiver 28 over respective paths 34. Each transceiver 28 may include a transmitter circuit configured to output uplink signals to antenna 42, may include a receiver circuit configured to receive downlink signals from antenna 42, and may be coupled to one or more antennas 42 over respective radio-frequency transmission line paths 36. Each radio-frequency transmission line path 36 may have a respective front end module 40 disposed thereon. If desired, two or more front end modules 40 may be disposed on the same radio-frequency transmission line path 36. If desired, one or more of the radio-frequency transmission line paths 36 in wireless circuitry 24 may be implemented without any front end module disposed thereon.

Front end module (FEM) 40 may include radio-frequency front end circuitry that operates on the radio-frequency signals conveyed (transmitted and/or received) over radio-frequency transmission line path 36. Front end module may, for example, include front end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifiers and one or more low-noise amplifiers), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other desired circuitry that operates on the radio-frequency signals transmitted and/or received by antenna 42. Each of the front end module components may be mounted to a common (shared) substrate such as a rigid printed circuit board substrate or flexible printed circuit substrate. If desired, the various front end module components may also be integrated into a single integrated circuit chip.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include one or more transmission lines that are used to route radio-frequency signals within device 10 (FIG. 1). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 36 may be integrated into rigid and/or flexible printed circuit boards. In one suitable implementation, radio-frequency transmission line paths such as radio-frequency transmission line path 36 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Transceiver 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands above 100 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

The term "convey radio-frequency signals" as used herein means the transmission and/or reception of the radio-frequency signals (e.g., for performing unidirectional and/or bidirectional wireless communications with external wireless communications equipment). In performing wireless transmission, processor 26 may provide digital signals to transceiver 28 over path 34. Transceiver 28 may further include circuitry for converting the baseband signals received from processor 26 into corresponding intermediate frequency or radio-frequency signals. For example, transceiver 28 may include mixer circuitry 45 that up-converts (or modulates) the baseband signals to intermediate frequencies (e.g., as intermediate frequency (IF) signals), that up-converts the baseband signals to radio frequencies higher than the intermediate frequencies (e.g., as radio-frequency (RF) signals), and/or that up-converts IF signals to radio frequencies prior to transmission over antenna 42. Transceiver 28 may also include digital-to-analog converter (DAC) and/or analog-to-digital converter (ADC) circuitry that converts signals between digital and analog domains. Transceiver 28 may include amplifier circuitry 41 (e.g., one or more power amplifiers) that amplify the radio-frequency signals for transmission. Additionally or alternatively, one or more power amplifiers in amplifier circuitry 48 may amplify the radio-frequency signals for transmission. Transceiver 28 may include a transmitter that transmits the radio-frequency signals over antenna 42 via radio-frequency transmission line path 36 and front end module 40. Antenna 42 may transmit the radio-frequency signals to external wireless equipment by radiating the radio-frequency signals into free space (or into free space through a dielectric cover layer on device 10).

In performing wireless reception, antenna 42 may receive radio-frequency signals from external wireless equipment (e.g., from free space). The received radio-frequency signals may be conveyed to transceiver 28 via radio-frequency transmission line path 36 and front end module 40. One or more low noise amplifiers in amplifier circuitry 41 and/or amplifier circuitry 48 may amplify the received signals. Transceiver 28 may include circuitry for converting the received radio-frequency signals into corresponding intermediate frequency or baseband signals. For example, transceiver 28 may use mixer circuitry 45 to downconvert (or demodulate) the received radio-frequency signals to intermediate frequencies, to downconvert the received radio-frequency signals to baseband frequencies (e.g., as baseband signals or baseband data), and/or to downconvert IF signals to baseband frequencies prior to conveying the received signals to processor 26 over path 34. Mixer circuitry 45 can include local oscillator circuitry such as local oscillator (LO) circuitry 43. Local oscillator circuitry 43 can generate oscillator signals that mixer circuitry 45 uses to modulate transmit signals from baseband frequencies to radio frequencies and/or to demodulate received signals from radio frequencies to baseband frequencies.

Electronic devices such as device 10 may include circuitry that transmits an electrical signal on a transmit path. This circuitry includes a signal source, which can be modeled as an arbitrary source impedance having a source power, that is coupled to an output node over the transmit path. The output node may be coupled to an output load having an output impedance. In signal transmission systems such as these, it may be desirable to be able to perform measurements of the transmit signal at the output node. For example, measurements of the output power level of the transmitted signal at the output node can be used to characterize performance of the output load, which can then be used to calibrate subsequent signal transmissions, to adjust circuitry in device 10, or to perform other actions.

Figure 3:
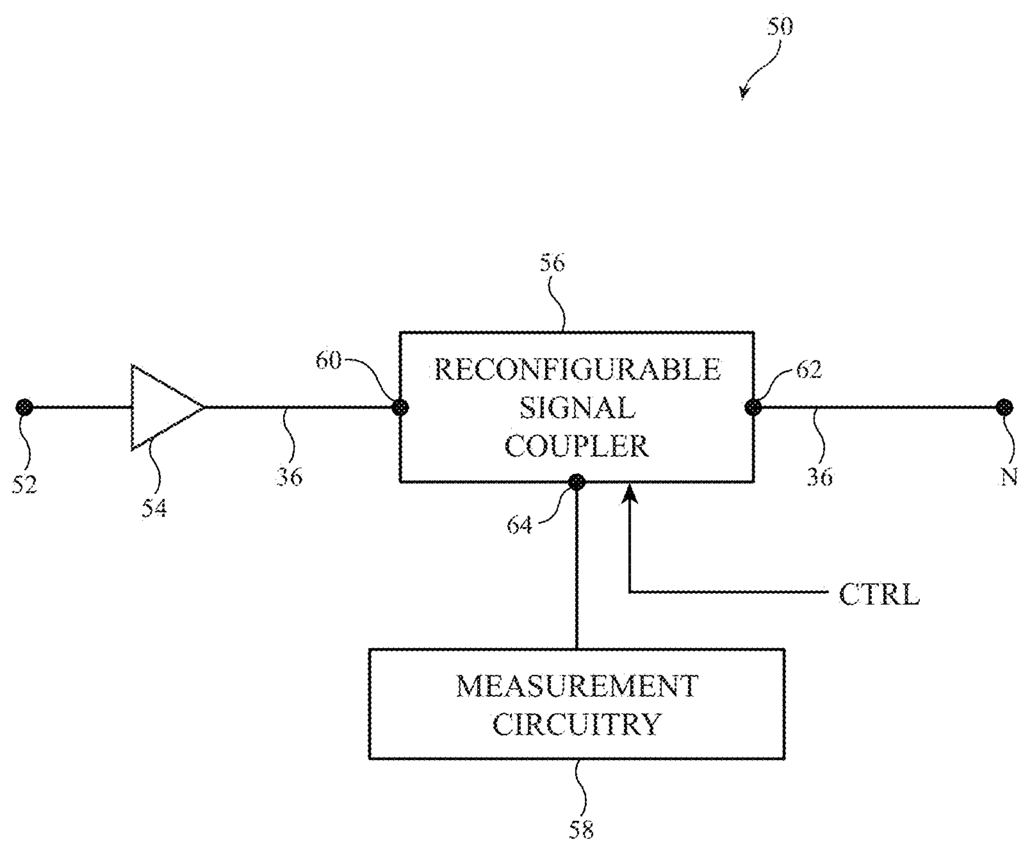
FIG. 3 is a diagram of an illustrative transmit path having a reconfigurable signal coupler for measuring a radio-frequency signal on the transmit path.

FIG. 3 is a diagram of an illustrative transmit path 50 in device 10. As shown in FIG. 3, transmit path 50 may be coupled between an input node 52 and an output node N.

Transmit path 50 may include a signal source 54 coupled between input node 52 and output node N. Transmit path 50 is sometimes also referred to herein as signal path 50, transmit signal path 50, transmit chain 50, signal transmission circuitry 50, or transmit signal circuitry 50.

Transmit path 50 may, for example, form a part of wireless circuitry 24 (FIG. 1). In this example, transmit path 50 may include a radio-frequency transmission line path 36 that couples input node 52 to output node N. As one example, signal source 54 may be an amplifier such as a power amplifier (PA) (e.g., in transceiver circuitry 28 of FIG. 2). Node N may be coupled to an output load such as a corresponding antenna 42 (FIG. 2), a component of front end module 40 (FIG. 2), or other radio-frequency circuitry. Transmit path 50 may carry, convey, propagate, and/or transmit a radio-frequency signal from signal source 54 (or input node 52) to output node N. The radio-frequency signal may be in any desired frequency band. If desired, the radio-frequency signal may carry wireless data (e.g., a stream of data packets, symbols, frames, datagrams, etc., as modulated onto a carrier by one or more mixers in transceiver circuitry 28 of FIG. 2). Alternatively, the radio-frequency signal may be devoid of wireless data (e.g., may carry a reference signal waveform, may carry a spatial ranging signal such as a radar waveform, etc.).

Although implementations in which transmit path 50 forms a part of wireless circuitry 24 for transmitting radio-frequency signals over a corresponding antenna 42 are described herein as an example, transmit path 50 may, in general, include any desired signal transmission circuitry in device 10 (e.g., for transmitting signals at any frequencies between different boards, packages, nodes, chips, integrated circuits, processors, components, accessories, devices such as device 10, etc.). The systems and methods for measuring power levels and otherwise characterizing the performance of output node N when transmit path 50 forms a part of wireless circuitry 24 for transmitting radio-frequency signals over an antenna 42 as described herein may be similarly applied in any of these signal transmission contexts.

The output load coupled to output node N (e.g., an antenna 42) may have a corresponding impedance. The impedance of the output load may vary (e.g., at a given frequency) due to changes in one or more operating characteristics of the output load and/or environmental conditions around the output load, such as when an external object approaches the output load. In examples where the output load is an antenna, an external object (e.g., a user's hand or other body part) may externally load the antenna, causing the antenna to become detuned and producing an impedance discontinuity between output node N and radio-frequency transmission line path 36. This impedance discontinuity may cause a relatively large amount of the transmitted signal power to be reflected back towards signal source 54 from output node N, reducing the overall efficiency of the antenna.

If desired, measurement circuitry 58 may be operably coupled to transmit path 50. Measurement circuitry 58 may measure the output power of transmit path 50 by measuring the power level of the radio-frequency signal output by transmit path 50 onto output node N. Control circuitry 14 (FIG. 1) may be communicatively coupled to measurement circuitry 58 and/or may include one or more processors that form a part of measurement circuitry 58. Control circuitry 14 may identify (e.g., measure, detect, generate, calculate, estimate, determine, compute, etc.) a complex impedance of the output load coupled to output node N (e.g., as subject to external loading by external object 54) based on the measured output power of transmit path 50. Control circuitry 14 may use this information to adjust impedance matching circuitry for the antenna, to adjust tuning of the antenna, to reduce transmit power level of signal source 54 (e.g., to comply with regulatory limits on radio-frequency energy exposure or absorption), and/or to perform any other desired operations or adjustments to subsequent signal transmission over transmit path 50 and/or other signal paths in device 10.

Transmit path 50 may include a signal coupler disposed along radio-frequency transmission line path 36 and operably coupled to measurement circuitry 58. The signal coupler may couple some of the radio-frequency signal propagating along radio-frequency transmission line path 36 (e.g., along a signal path of the signal coupler) off of the radio-frequency transmission line path (e.g., onto a coupled path of the signal coupler) and towards measurement circuitry 58. Measurement circuitry 58 may measure the power of the radio-frequency signal based on the portion of the radio-frequency signal coupled off of radio-frequency transmission line path 36 by the signal coupler. Measurement circuitry 58 may include a voltage detector (sensor), a power detector (sensor), a feedback receiver, and/or any other desired circuitry that measures the power of the portion of the radio-frequency signal coupled off of radio-frequency transmission line path 36 by the signal coupler.

In some implementations, the measurement circuitry includes a voltage detector and squaring circuit that detects power with an impedance assumption to convert voltage to power formula. However, in practice, the interface impedance can be very different from this impedance assumption due to on-chip device variation or external interconnection reflection such as cable voltage standing wave ratio (VSWR). In some implementations, the signal coupler is a fixed (non-reconfigurable) and symmetric signal coupler having a signal path and a coupled path of equal lengths that remain the same over time. However, these types of signal couplers can exhibit excessive coupling loss, can exhibit excessive power loss, and/or can limit the dynamic range with which the measurement circuitry measures power of the radio-frequency signal.

To mitigate these issues, transmit path 50 may include an asymmetric reconfigurable signal coupler such as reconfigurable signal coupler 56 disposed on radio-frequency transmission line path 36. Reconfigurable signal coupler 56 may couple some of the radio-frequency signal off of radio-frequency transmission line path 36 and towards measurement circuitry 58. Measurement circuitry 58 may include a power detector and/or any other desired circuitry for receiving and/or measuring the portion of the radio-frequency signal coupled off of radio-frequency transmission line path 36 by reconfigurable signal coupler 56. The radio-frequency signal coupled off of radio-frequency transmission line path 36 may exhibit a voltage at the power detector in measurement circuitry 58. The power detector may measure this voltage and/or the power associated with this voltage (e.g., the power detector may convert a radio-frequency voltage waveform into a DC voltage). Control circuitry 14 (FIG. 1) may process the voltage and/or power measured by the power detector to measure (e.g., estimate, determine, identify, compute, calculate, generate, sense, etc.) the signal or power wave at output node N, which may be characteristic of output power level of the radio-frequency signal output by transmit path 50 at output node N (e.g., without placing a power detector directly at output node N, thereby accommodating the presence of additional circuit blocks along transmit path 50).

If desired, reconfigurable signal coupler 56 may be a four-port signal coupler having at least a first node 60, a second node 62, a third node 64, and a fourth node 66. Nodes 60-66 are sometimes also referred to herein as ports of reconfigurable signal coupler 56. Fourth node 66 is coupled to one or more impedance terminations and is not illustrated in FIG. 3 for the sake of clarity. Fourth node 66 is sometimes also referred to herein as isolated node 66 or isolated port 66 of reconfigurable signal coupler 56.

Node 60 is communicatively coupled to input node 52 and the output of signal source 54 over a first portion of radio-frequency transmission line path 36. Node 60 is sometimes also referred to herein as input node 60 or input port 60. Node 62 is communicatively coupled to output node N over a second portion of radio-frequency transmission line path 36. Node 62 is sometimes also referred to herein as output node 62 or output port 62. In implementations where an antenna is coupled to output node N, output node 62 is sometimes also referred to as antenna node 62 or antenna port 62. Node 64 is communicatively coupled to the input of measurement circuitry 58. Node 64 is sometimes also referred to herein as coupled node 64 or coupled port 64.

If desired, additional circuit blocks or components (not shown in FIG. 2 for the sake of clarity) may be disposed on radio-frequency transmission line path 36 between input node 52 and signal source 54 and/or between signal source 54 and reconfigurable signal coupler 56. In some implementations, signal source 54 may be a differential power amplifier and a balun may be disposed on radio-frequency transmission line path 36 between the differential power amplifier and reconfigurable signal coupler 56 for converting the radio-frequency signal on radio-frequency transmission line path 36 between a differential signal (e.g., as output by the differential power amplifier) and a single-ended signal (e.g., as provided to reconfigurable signal coupler 56). If desired, reconfigurable signal coupler 56 may include one or more switches that configure the signal coupler to couple either forward wave or reverse wave (e.g., reflected) signals off of radio-frequency transmission line path 36 and towards measurement circuitry 58 (e.g., reconfigurable signal coupler 56 may form a switch coupler or reflectometer).

Reconfigurable signal coupler 56 includes a signal path formed from a segment of radio-frequency transmission line path 36. Reconfigurable signal coupler 56 also includes a coupled path that extends along the signal path (e.g., parallel to or coextensive with the signal path). The coupled path is electromagnetically coupled to the signal path at the frequencies of the radio-frequency signal on radio-frequency transmission line path 36 (e.g., via a near-field electromagnetic coupling such as one or more capacitive couplings and/or one or more inductive couplings). The strength or amount of the electromagnetic coupling may be characterized by corresponding coupling factor, constant, or coefficient.

Unlike fixed signal couplers, which have a coupled path with a fixed length equal to the fixed length of the signal path, reconfigurable signal coupler 56 includes a coupled path of variable length. Reconfigurable signal coupler 56 may include one or more switches that are controlled by control signal CTRL (e.g., received from control circuitry 14 of FIG. 1) to effectively change the length of the coupled path over time. For example, reconfigurable signal coupler 56 may be switched between at least a first operating mode or state (sometimes also referred to herein as a high coupling mode or state) and a second operating mode or state (sometimes also referred to herein as a low coupling mode or state).

In the high coupling mode, the switch(es) in reconfigurable signal coupler 56 configure the coupled path in reconfigurable signal coupler 56 to have a relatively long length (e.g., a length equal to the length of the signal path). In the low coupling mode, the switch(es) in reconfigurable signal coupler 56 configure the coupled path in reconfigurable signal coupler 56 to have a relatively short length (e.g., a length less than the length of the signal path). Control signal CTRL may be provided to the switch(es) in reconfigurable signal coupler 56 to place the signal coupler into a selected one of the low or high coupling modes at a given time and to switch between the low and high coupling modes over time. Measurement circuitry 58 may measure different ranges of power levels based on whether reconfigurable signal coupler 56 is in the low coupling mode or the high coupling mode. By switching reconfigurable signal coupler 56 between the low and high coupling modes over time, device 10 may increase the dynamic range with which measurement circuitry 58 measures the power of the radio-frequency signal on radio-frequency transmission line path 36.

Figure 4:
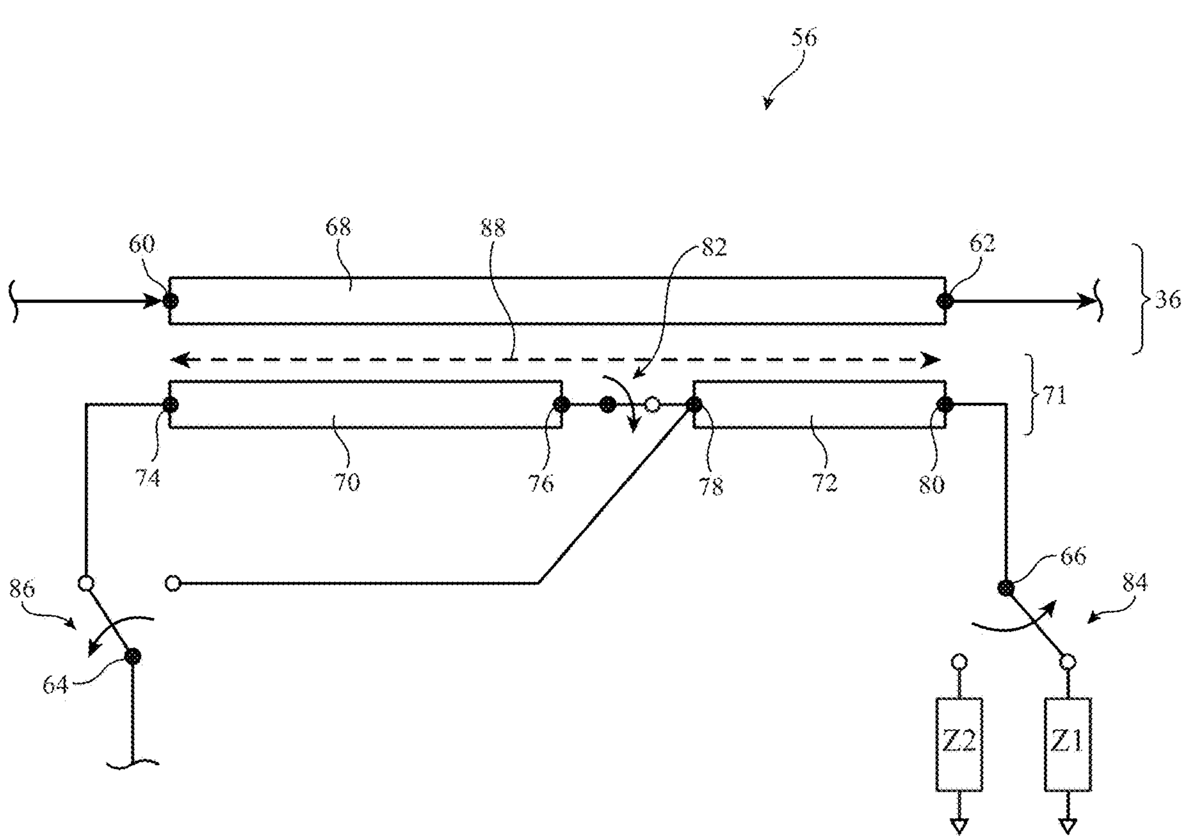
FIG. 4 is a circuit diagram of an illustrative reconfigurable signal coupler configured in a high coupling mode in accordance with some embodiments.

FIG. 4 is a circuit diagram of reconfigurable signal coupler 56 while placed in the high coupling mode. As shown in FIG. 4, reconfigurable signal coupler 56 may include a signal path 68 on radio-frequency transmission line path 36. Signal path 68 may have a first end coupled to input node 60 and may have an opposing second end coupled to output node 62 of reconfigurable signal coupler 56.

Signal path 68 may, for example, include a signal conductor such as a segment of the signal conductor in a transmission line of radio-frequency transmission line path 36. While illustrated as a linear path in FIG. 4 for the sake of simplicity, signal path 68 may include one or more windings or turns of conductive material (e.g., conductive traces) around a central axis. This may serve to extend the length of signal path 68, which increases the amount of coupling between signal path 68 and the coupled path of reconfigurable signal coupler 56, without substantially increasing the footprint of reconfigurable signal coupler 56 on an underlying substrate. Signal path 68 is sometimes also referred to herein as signal conductor 68 of reconfigurable signal coupler 56.

Reconfigurable signal coupler 56 may also include a coupled path 71 extending along signal path 68. Coupled path 71 may be coupled between coupled node 64 and isolated node 66 of reconfigurable signal coupler 56. Coupled path 71 may be electromagnetically coupled to signal path 68 along its length (e.g., via near-field electromagnetic coupling characterized by a corresponding coupling factor).

Coupled path 71 may be a reconfigurable coupled path having an adjustable, reconfigurable, and/or variable length. For example, coupled path 71 may include at least a first conductor 70 and a second conductor 72 coupled to conductor 70 by switching circuitry such as switch 82. Switch 82 is sometimes also referred to herein as coupled path switch 82. Conductor 70, switch 82, and conductor 72 may be coupled in series between the coupled node and the isolated node (e.g., where switch 82 is coupled in series between conductors 70 and 72). Conductors 70 and 72 are sometimes also referred to herein as coupled path conductors or as portions or segments of coupled path 71. Examples in which coupled path 71 includes two conductors are described herein as an example. If desired, coupled path 71 may include more than two conductors coupled in series with corresponding switches between the coupled node and the isolated node of reconfigurable signal coupler 56. In these implementations, reconfigurable signal coupler 56 may have more than two operating modes and may have a different respective coupling factor in each of the operating modes.

While illustrated as a linear path in FIG. 4 for the sake of simplicity, conductor 70 may include one or more windings or turns of conductive material (e.g., conductive traces) around a central axis on the substrate for reconfigurable signal coupler 56. Additionally or alternatively, conductor 72 may include one or more windings or turns of conductive material (e.g., conductive traces) around a central axis on the substrate for reconfigurable signal coupler 56. This may serve to extend the length of conductor 70 and/or conductor 72, which increases the amount of coupling between signal path 68 and coupled path 71 without substantially increasing the footprint of reconfigurable signal coupler 56 on the underlying substrate. If desired, conductor 70 and/or conductor 72 may include a fraction of a winding or turn on the underlying substrate.

In the example of FIG. 4, conductor 70 is longer than conductor 72. This is illustrative and non-limiting. If desired, conductor 72 may be longer than conductor 70 or conductors 72 and 70 may have the same length. If desired, the cumulative length of conductors 70 and 72 may be equal to the fixed length of signal path 68. Coupled path 71 is sometimes also referred to herein as the coupled conductors 71 of reconfigurable signal coupler 56.

Conductor 70 may extend from a first end to a second end opposite the first end. Conductor 72 may extend from a first end to a second end opposite the first end. Switch 82 may couple a terminal 76 at the second end of conductor 70 to a terminal 78 at the first end of conductor 72. The isolated node 66 of reconfigurable signal coupler 56 may be coupled to the second end of conductor 72 at terminal 80.

Switch 82 may be, for example, a single-pole single-throw (SPST) switch. Switch 82 may have a first switch state in which switch 82 couples terminal 76 of conductor 70 to terminal 78 of conductor 72 (e.g., forming a short circuit path, a zero impedance, less than a threshold impedance, or more than a threshold transconductance between terminals 76 and 78). Switch 82 may have a second switch state in which switch 82 decouples terminal 76 of conductor 70 from terminal 78 of conductor 72 (e.g., forming an open circuit path, an infinite impedance, more than a threshold impedance, or less than a threshold transconductance between terminals 76 and 78). Switch 82 is illustrated as being in its first switch state in the example of FIG. 4.

Switch 82 may, in one example, include a transistor having source/drain terminals coupled between terminals 76 and 78. Switch 82 may receive a gate voltage (e.g., in control signal CTRL of FIG. 3) that places switch 82 in the first or second switch state or that switches switch 82 between the first and second switch states. The gate voltage may, for example, be asserted at a high level to turn on, activate, enable, or close switch 82, placing switch 82 in the first switch state. The gate voltage may be de-asserted to turn off, deactivate, disable, or open switch 82, placing switch 82 in the second switch state.

Reconfigurable signal coupler 56 may include additional switching circuitry such as a switch 86 coupled to the coupled node 64 of reconfigurable signal coupler 56. Switch 86 is sometimes also referred to herein as coupled node switch 86. Coupled node 64 is coupled to measurement circuitry 58 (FIG. 3). Switch 86 may have a first terminal coupled to coupled node 64, a second terminal coupled to terminal 74 at the first end of conductor 70, and a third terminal coupled to terminal 78 at the first end of conductor 72 (or another terminal at the first end of conductor 72 and adjacent terminal 78). Switch 86 may be, for example, a single-pole double-throw (SPDT) switch.

Switch 86 may have a first switch state in which switch 86 couples its first terminal and thus coupled node 64 to its second terminal and thus terminal 74 on conductor 70 (e.g., forming a short circuit path, a zero impedance, less than a threshold impedance, or more than a threshold transconductance between coupled node 64 and terminal 74 while concurrently forming an open circuit path, an infinite impedance, more than a threshold impedance, or more than a threshold transconductance between coupled node 64 and terminal 78). Switch 82 may have a second switch state in which switch 86 couples its first terminal and thus coupled node 64 to its third terminal and thus terminal 78 of conductor 70 (e.g., bypassing conductor 70 from the perspective of the coupled node). In the second switch state, switch 82 may form a short circuit path, a zero impedance, less than a threshold impedance, or more than a threshold transconductance between coupled node 64 and terminal 78 while concurrently forming an open circuit path, an infinite impedance, more than a threshold impedance, or more than a threshold transconductance between coupled node 64 and terminal 74). Switch 86 is illustrated as being in its first switch state in the example of FIG. 4.

Reconfigurable signal coupler 56 may include further switching circuitry such as switch 84. Switch 84 may switchably couple isolated node 66 to two or more impedance terminations Z. Switch 84 is sometimes also referred to herein as isolated node switch 84. For example, switch 84 may have a first terminal coupled to isolated node 66, a second terminal coupled to a first impedance termination Z1, and a third terminal coupled to a second impedance termination Z2. Switch 84 may be, for example, an SPDT switch.

Switch 84 may have a first switch state in which switch 84 couples its first terminal and thus isolated node 66 to its second terminal and thus impedance termination Z1. Switch 84 may have a second switch state in which switch 84 couples its first terminal and thus isolated node 66 to its second terminal and thus impedance termination Z2. Switch 84 is illustrated as being in its first switch state in the example of FIG. 4.

Impedance termination Z1 may include any desired number of inductors, resistors, capacitors, and/or switches coupled between the second terminal of switch 84 and ground in series, in parallel, and/or in any other desired manner. Impedance termination Z2 may include any desired number of inductors, resistors, capacitors, and/or switches coupled between the third terminal of switch 84 and ground in series, in parallel, and/or in any other desired manner. The inductors, resistors, and/or capacitors in impedance terminations Z1 and Z2 may be fixed components or may be adjustable (e.g., impedance terminations Z1 and Z2 may be fixed or adjustable). Impedance termination Z1 may exhibit a different impedance than impedance termination Z2. The active impedance termination may determine the isolated node impedance of reconfigurable signal coupler 56 and may, if desired, be selected to maximize the resilience of power measurements performed using the reconfigurable signal coupler across different VSWRs of the output load. More generally, switch 84 may switchably couple isolated node 66 to any desired number of one or more impedance terminations Z.

Control signal CTRL (FIG. 3) may control the state of switches 82, 86, and 84 to switch reconfigurable signal coupler 56 between the high and low coupling modes. For example, control signal CTRL may place reconfigurable signal coupler 56 in the high coupling mode (shown in FIG. 4) by placing switch 86 in its first switch state (coupling terminal 74 to coupled node 64), placing switch 82 in its first switch state (coupling terminal 76 to terminal 78), and placing switch 84 in its first switch state (coupling terminal 80 to impedance termination Z1).

This configures reconfigurable signal coupler 56 to include both conductors 70 and 72 in coupled path 71, where switch 86, conductor 70, switch 82, and conductor 72 are coupled in series with each other between coupled node 64 and isolated node 66. At the same time, switch 84 loads isolated node 66 with impedance termination Z1. When radio-frequency transmission line path 36 conveys a radio-frequency signal, the signal passes along signal path 68 from input node 60 to output node 62. A portion of the radio-frequency signal is coupled off of signal path 68 and onto signal conductors 70 and 72 along the entire length 88 of coupled path 71. This maximizes the amount of electromagnetic coupling (e.g., coupling factor) between signal path 68 and coupled path 71, causing as much of the radio-frequency signal to be coupled off of radio-frequency transmission line path 36 and provided to the measurement circuitry as possible given the geometry of signal path 68 and coupled path 71. The coupled signal is passed onto coupled node 64 and provided to the measurement circuitry via conductor 72, switch 82, conductor 70, and terminal 74.

Figure 5:
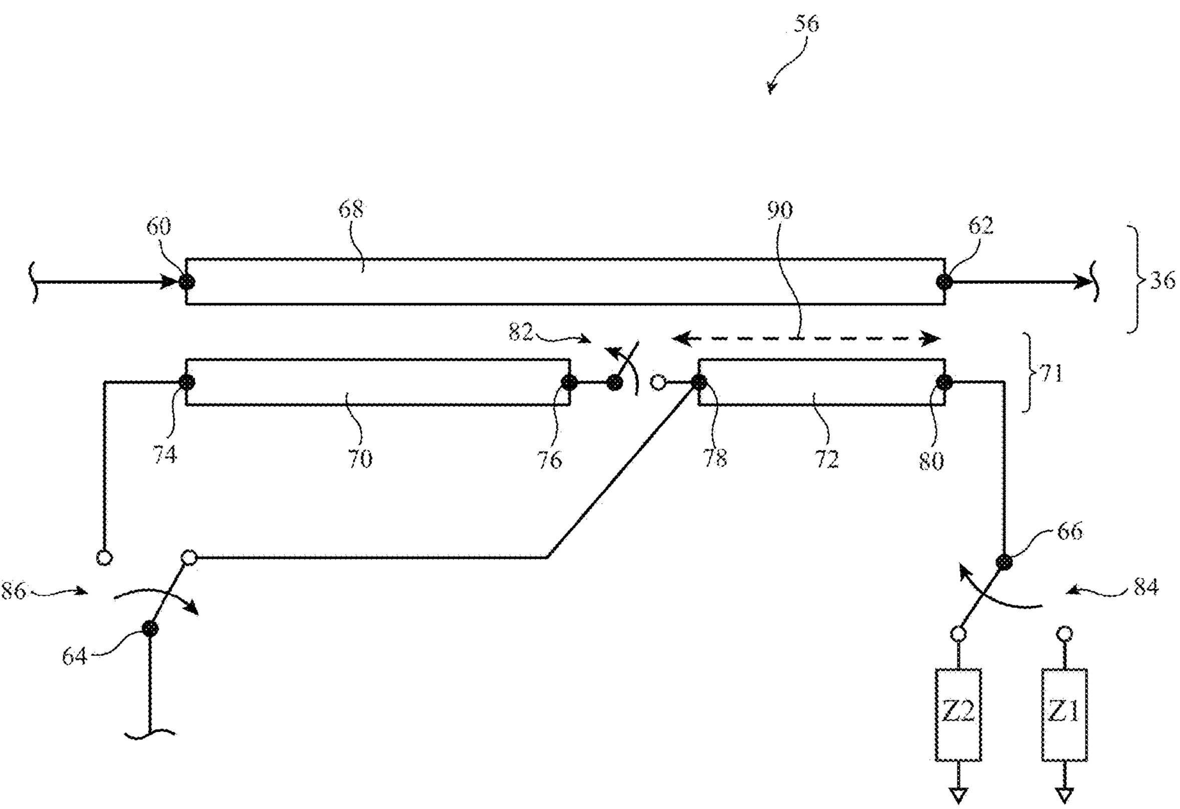
FIG. 5 is a circuit diagram of an illustrative reconfigurable signal coupler configured in a low coupling mode in accordance with some embodiments.

FIG. 5 is a circuit diagram of reconfigurable signal coupler 56 while placed in the low coupling mode. As shown in FIG. 5, control signal CTRL may place reconfigurable signal coupler 56 in the low coupling mode by placing switch 86 in its second switch state (coupling terminal 78 on conductor 72 to coupled node 64), placing switch 82 in its second switch state (decoupling terminal 76 from terminal 78), and placing switch 84 in its second switch state (coupling terminal 80 to impedance termination Z2).

This configures reconfigurable signal coupler 56 to include conductor 72 but not conductor 70 in coupled path 71 (e.g., conductor 70 is floating or isolated with respect to coupled node 64 and is removed from coupled path 71). Switch 86 and conductor 72 are coupled in series between coupled node 64 and isolated node 66. At the same time, switch 84 loads isolated node 66 with impedance termination Z2.

A portion of the radio-frequency signal is coupled off of signal path 68 and onto conductor 72 only along a length 90 of coupled path 71 that is less than the entire length of coupled path 71 (e.g., where length 90 is given by the length of conductor 72 between terminals 78 and 80). The radio-frequency signal is not coupled onto conductor 70 from signal path 68. This reduces the amount of electromagnetic coupling (e.g., coupling factor) between signal path 68 and coupled path 71, causing less of the radio-frequency signal to be coupled off of radio-frequency transmission line path 36 and provided to the measurement circuitry than when reconfigurable signal coupler 56 is operating in the high power mode.

The control circuitry may place reconfigurable signal coupler 56 into a selected one of the high or low power modes at a given time (e.g., based on the present output power level of signal source 54 of FIG. 3). This may serve to effectively extend the dynamic range over which the measurement circuitry is able to measure the power of the radio-frequency signal. At the same time, there are no switches present in the signal path 68 of reconfigurable signal path 56. This serves to reduce insertion loss that would otherwise be imparted on the transmitted radio-frequency signal by the signal coupler and/or by a power detector directly connected to the radio-frequency transmission line path.

Figure 6:
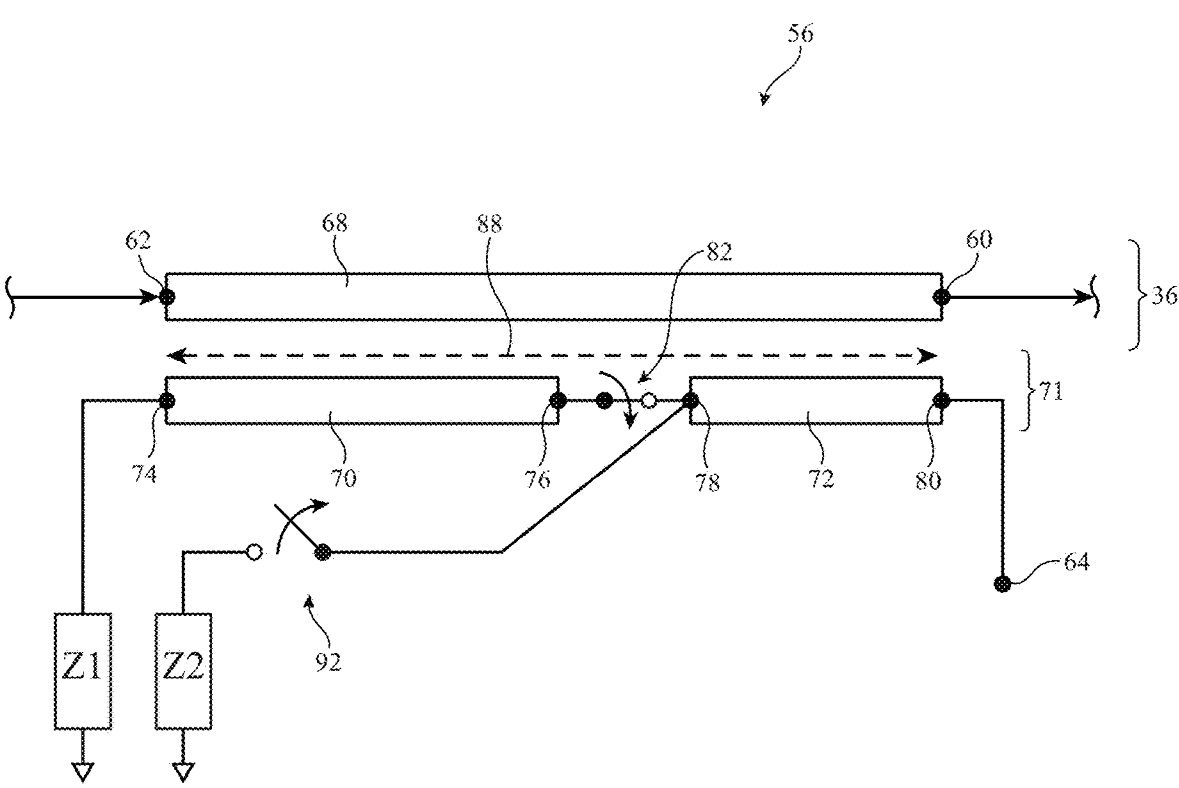
FIG. 6 is a circuit diagram of another illustrative reconfigurable signal coupler configured in a high coupling mode in accordance with some embodiments.
Figure 7:
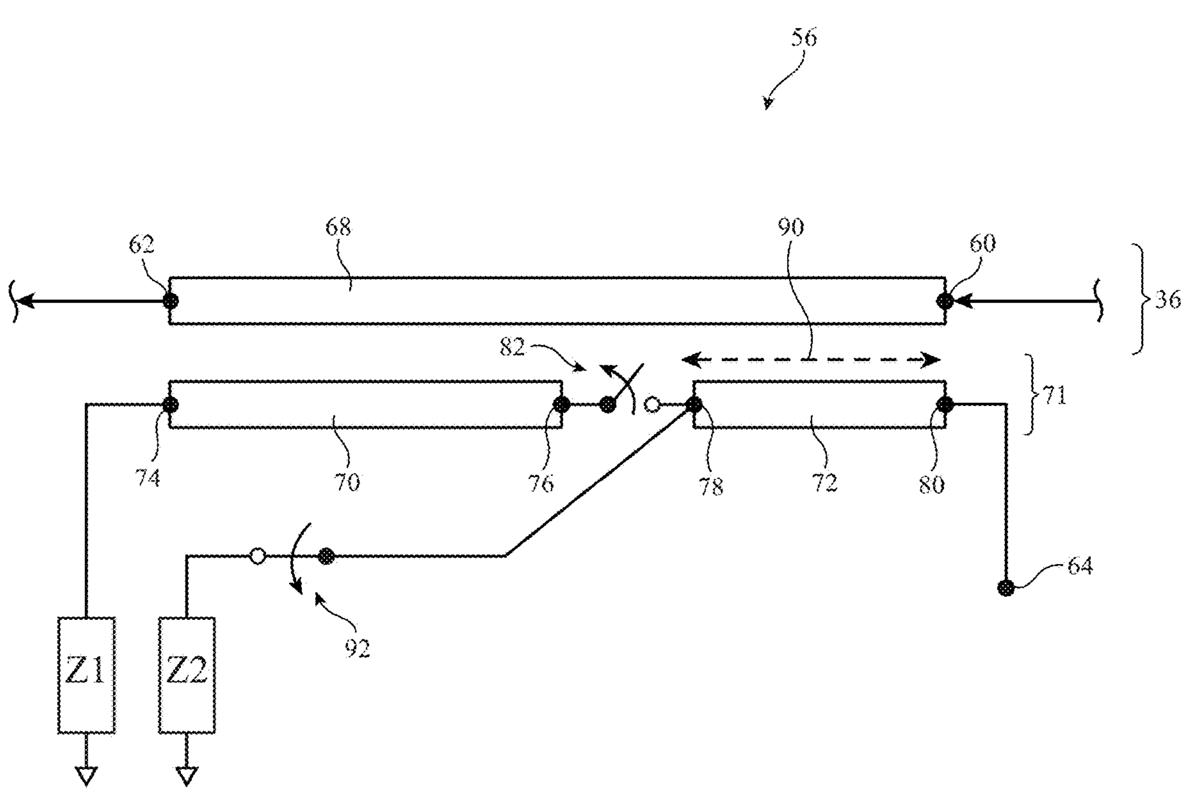
FIG. 7 is a circuit diagram of another illustrative reconfigurable signal coupler configured in a low coupling mode in accordance with some embodiments.

If desired, the number of switches in reconfigurable signal coupler 56 may be reduced to further decrease the amount of loss imparted by the signal coupler to the radio-frequency signal. FIGS. 6 and 7 show another example of reconfigurable signal coupler 56 having fewer switches than the implementations shown in FIGS. 4 and 5.

As shown in FIG. 6, the location of input node 60 and output node 62 on signal path 68 may be swapped. Coupled node 64 may be coupled to terminal 80 on conductor 72. Terminal 74 on conductor 70 may be coupled to impedance termination Z1. Terminal 78 on conductor 72 may be coupled to impedance termination Z2 through switch 92 (e.g., an SPST). Switch 92 is sometimes also referred to herein as isolated node switch 92 or impedance termination switch 92. In this implementation, there are no switches between coupled node 64 and coupled path 71 (e.g., reducing insertion loss that would otherwise be produced by such a switch on the coupled signal provided to the measurement circuitry).

In the example of FIG. 6, reconfigurable signal coupler 56 is illustrated in its high coupling mode. In the high coupling mode, switch 82 is closed and switch 92 is open. This couples conductor 70, switch 82, and conductor 72 in series between impedance termination Z1 and coupled node 64 (e.g., terminal 74 may form the isolated node 66 of reconfigurable signal coupler 56).

A portion of the radio-frequency signal propagating along signal path 68 is coupled off of signal path 68 and onto signal conductors 70 and 72 along the entire length 88 of coupled path 71. The portion of the radio-frequency signal coupled onto conductors 70 and 72 is conveyed to the measurement circuitry through terminal 80 and coupled node 64. This maximizes the amount of electromagnetic coupling between signal path 68 and coupled path 71, causing as much of the radio-frequency signal to be coupled off of radio-frequency transmission line path 36 and provided to the measurement circuitry as possible given the geometry of signal path 68 and coupled path 71.

FIG. 7 illustrates the reconfigurable signal coupler 56 of FIG. 5 while in its low coupling mode. As shown in FIG. 7, in the low coupling mode, switch 92 is closed and switch 82 is open. This configures reconfigurable signal coupler 56 to include conductor 72 but not conductor 70 in coupled path 71 (e.g., conductor 70 is floating or isolated with respect to coupled node 64 and is removed from coupled path 71). Switch 92 and conductor 72 are coupled in series between coupled node 64 and impedance termination Z2. At the same time, switch 92 loads the isolated node with impedance termination Z2.

A portion of the radio-frequency signal is coupled off of signal path 68 and onto conductor 72 only along a length 90 of coupled path 71. The radio-frequency signal is not coupled onto conductor 70 from signal path 68. This reduces the amount of electromagnetic coupling between signal path 68 and coupled path 71, causing less of the radio-frequency signal to be coupled off of radio-frequency transmission line path 36 and provided to the measurement circuitry than when reconfigurable signal coupler 56 is operating in the high power mode. The examples of FIGS. 4-7 are illustrative and non-limiting and, in practice, reconfigurable signal coupler 56 may have other architectures, may include additional components, etc.

Figure 8:
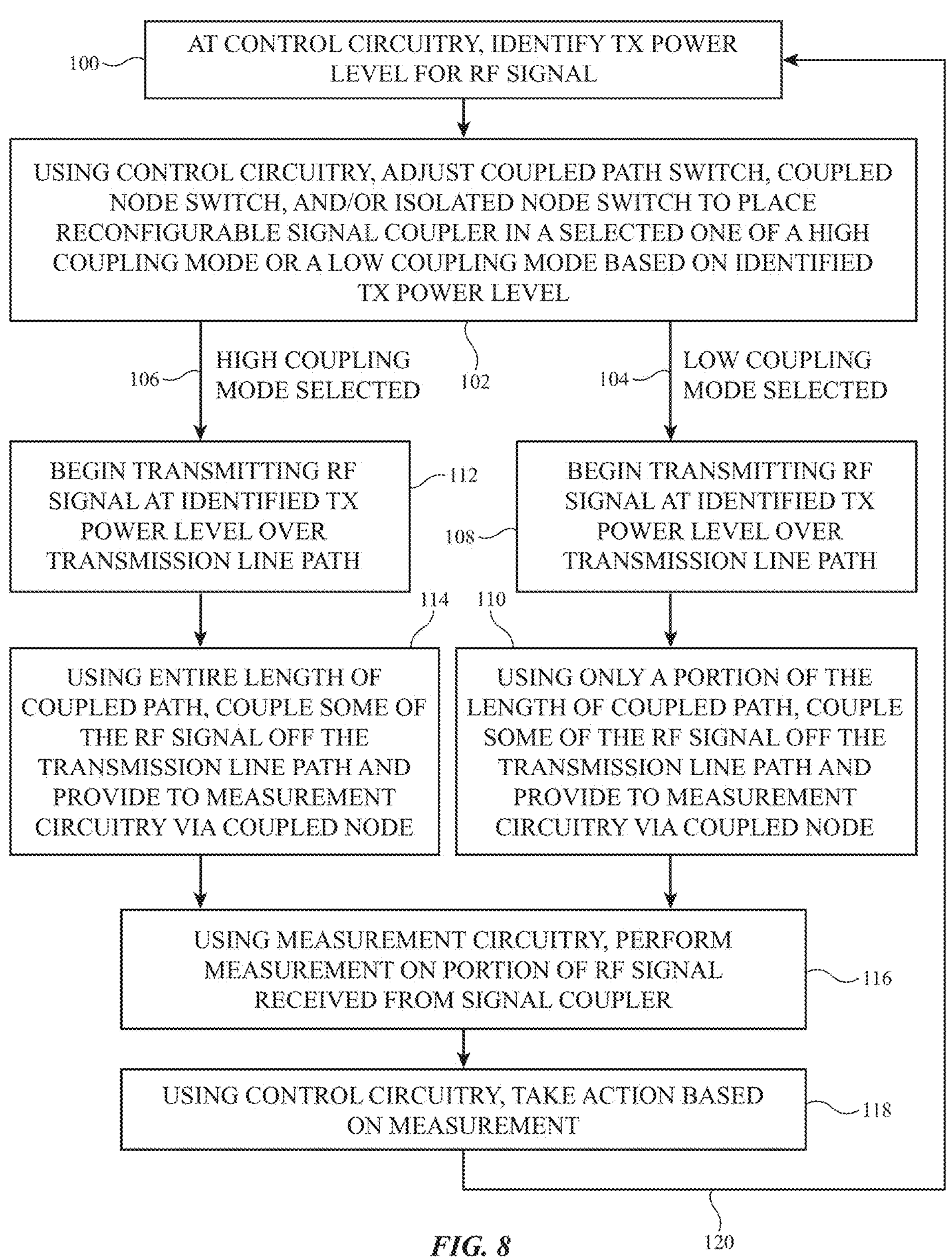
FIG. 8 is a flow chart of illustrative operations involved in transmitting a radio-frequency signal over a transmit path that includes a reconfigurable signal coupler in accordance with some embodiments.

FIG. 8 is a flow chart of illustrative operations that may be performed by device 10 to transmit a radio-frequency signal over radio-frequency transmission line path 36. At operation 100, control circuitry 14 (FIG. 1) may identify a transmit (TX) power level for the radio-frequency signal. The transmit power level may be, for example, an output power level of signal source 54 to be used for transmitting the radio-frequency signal given the current operating/environmental conditions of device 10, the radio resources assigned to device 10, etc.

At operation 102, control circuitry 14 may adjust switch 82 (FIGS. 4-7), switch 86 (FIGS. 4 and 5), switch 84 (FIGS. 4 and 5), and/or switch 92 (FIGS. 6 and 7) to place reconfigurable signal coupler 56 in a selected one of the high coupling mode (e.g., with a relatively high coupling factor) or the low coupling mode (e.g., with a relatively low coupling factor) based on the identified transmit power level. For example, if/when the identified transmit power level is within a first range of transmit power levels, control circuitry 14 may place reconfigurable signal coupler 56 in the high coupling mode. If/when the identified transmit power level is within a second range of transmit power levels, control circuitry 14 may place reconfigurable signal coupler 56 in the low coupling mode.

If/when control circuitry 14 places reconfigurable signal coupler 56 in the high coupling mode, processing may proceed to operation 112 via path 106. At operation 112 (e.g., responsive to control circuitry 14 placing reconfigurable signal coupler 56 in the high coupling mode), signal source 54 may begin transmitting a radio-frequency (RF) signal over radio-frequency transmission line path 36 at the identified transmit power level.

At operation 114, reconfigurable signal coupler 56 may couple a portion of the radio-frequency signal transmitted by signal source 54 off of its signal path 68 and onto conductors 70 and 72 along the entire length 88 of coupled path 71 (e.g., with a maximum amount of coupling between signal path 68 and coupled path 71). Reconfigurable signal coupler 56 may pass the portion of the radio-frequency signal coupled off of signal path 68 to measurement circuitry 58 (FIG. 3) via coupled node 64.

If/when control circuitry 14 places reconfigurable signal coupler 56 in the low coupling mode, processing may proceed from operation 102 to operation 108 via path 104. At operation 108 (e.g., responsive to control circuitry 14 placing reconfigurable signal coupler 56 in the low coupling mode), signal source 54 may begin transmitting a radio-frequency (RF) signal over radio-frequency transmission line path 36 at the identified transmit power level.

At operation 110, reconfigurable signal coupler 56 may couple a portion of the radio-frequency signal transmitted by signal source 54 off of its signal path 68 and onto only conductor 72 along length 90 of conductor 72 (e.g., with a reduced amount of coupling between signal path 68 and coupled path 71 and without coupling any of the signal onto conductor 70). Reconfigurable signal coupler 56 may pass the portion of the radio-frequency signal coupled off of signal path 68 to measurement circuitry 58 (FIG. 3) via coupled node 64.

At operation 116, measurement circuitry 58 may perform one or more measurements of the portion of the radio-frequency signal received from coupled node 64 of reconfigurable signal coupler 56. This may include voltage level measurements, power level measurements, power wave measurements, complex scattering parameter measurements, impedance measurements, VSWR measurements, forward wave measurements, reverse wave measurements, current measurements, magnitude measurements, phase measurements, and/or any other desired measurements.

At operation 118, control circuitry 14 may identify (e.g., generate, calculate, compute, determine, estimate, etc.) one or more characteristics associated with one or more components along or coupled to transmit path 50 (e.g., the output load coupled to output node N) based on the measurements performed by measurement circuitry 58. Additionally or alternatively, control circuitry 14 may perform one or more actions in device 10 based on the measurements performed by measurement circuitry 58 and/or based on the one or more characteristics. For example, control circuitry 14 may adjust, based on the measurements and/or characteristics, the output power level of signal source 54 (e.g., under an open or closed loop power control scheme), a power supply voltage or bias provided to signal source 54, tuning or matching of an antenna coupled to output node N or another antenna in device 10, one or more filters coupled to output N, beamforming by a phased antenna array on device 10, calibration of one or more components along or coupled to transmit path 50, etc. Processing may loop back to operation 100 via path 120 (e.g., to adjust the coupling factor of coupled path 71 relative to signal path 68 over time via selective activation or deactivation of conductor 70).

If desired, signal path 68, conductor 70, and conductor 72 in reconfigurable signal coupler 56 may each include one or more windings on an underlying substrate. The winding(s) of signal path 68, conductor 70, and/or conductor 72 may each be formed from a single layer of conductive traces or may each be formed from multiple layers of conductive traces on the substrate. This may serve to maximize the coupling length of reconfigurable signal coupler 56 and thus the performance of measurement circuitry 58 without increasing the footprint of reconfigurable signal coupler 56, which may help to conserve space in device 10.

Figure 9:
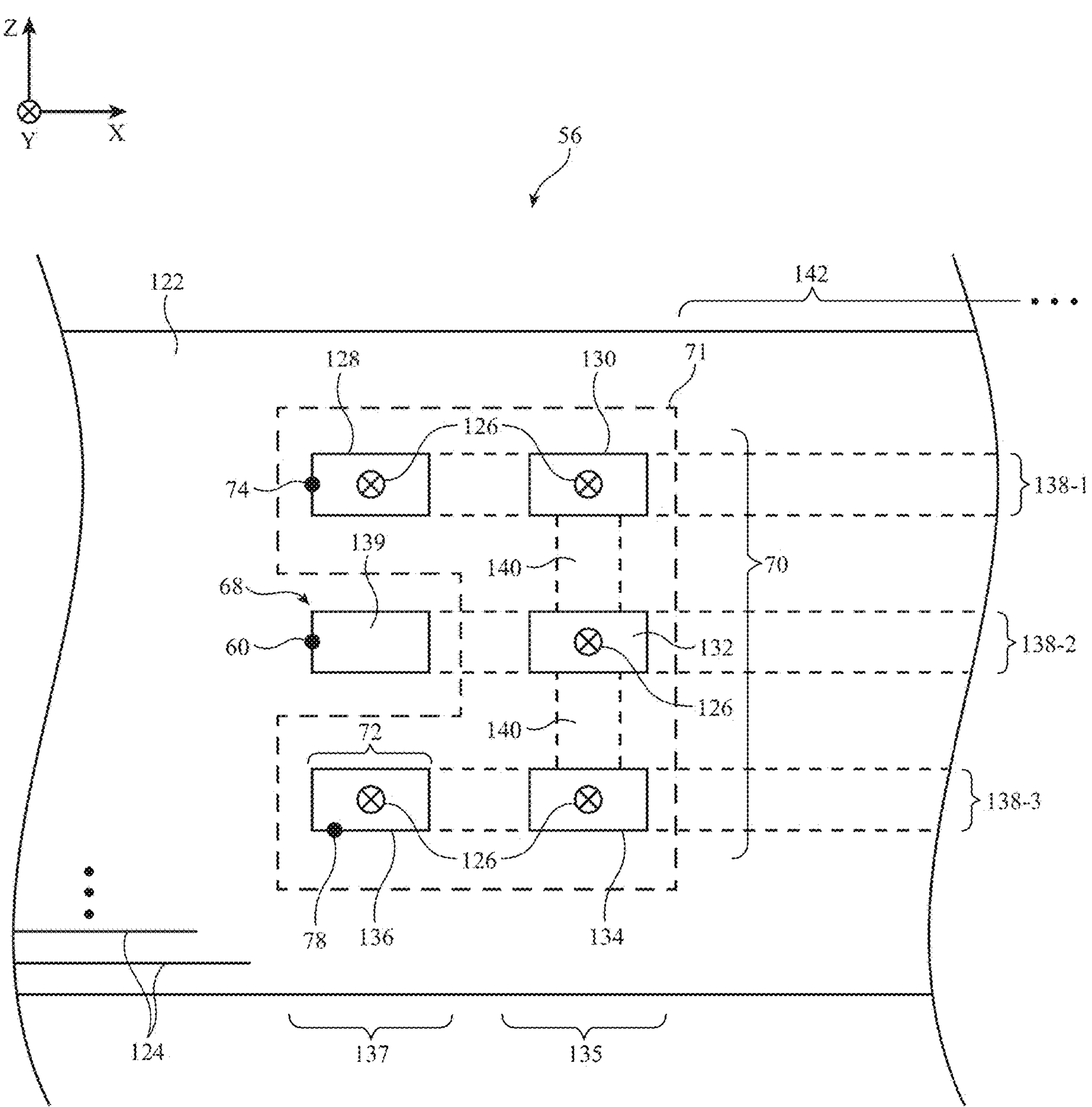
FIG. 9 is a cross-sectional side view of an illustrative reconfigurable signal coupler in accordance with some embodiments.

FIG. 9 is a cross-sectional side view showing one example of how reconfigurable signal coupler 56 may include multiple conductive windings distributed across different metallization layers of a substrate 122. As shown in FIG. 9, substrate 122 may include a set of stacked layers 124. Layers 124 may be insulator layers (e.g., dielectric layers such as layers of epoxy, resin, ceramic, polyimide, fiberglass, etc.) or semiconductor layers (e.g., silicon layers). Substrate 122 may also include metallization layers 138 interleaved with layers 124 (sometimes also referred to herein as metal layers 138 or conductive layers 138). Metallization layers 138 may include conductive material such as aluminum, copper, gold, etc. Substrate 122 may be a printed circuit board, a package substrate, or a semiconductor integrated circuit chip, as three examples.

Reconfigurable signal coupler 56 may include at least a first winding 128 and a second winding 130 formed in metallization layer 138-1 (e.g., a first layer of conductive traces on substrate 122), may include at least a first winding 139 and a second winding 132 formed in metallization layer 138-2 (e.g., a second layer of conductive traces on substrate 122), and may include at least a first winding 136 and a second winding 134 formed in metallization layer 138-3 (e.g., a third layer of conductive traces on substrate 122). Metallization layer 138-2 may be vertically interposed between metallization layers 138-1 and 138-3. Windings 128, 130, 139, 132, 136, and 134 are sometimes also referred to herein as coils or turns of conductive traces.

Windings 127, 130, 132, 134, 136, and 139 may each laterally wrap, extend, or coil around a central opening 142 (e.g., when viewed in the −Z direction). Winding 128 may laterally wrap, extend, or coil around winding 130. Winding 139 may laterally wrap, extend, or coil around winding 132. Winding 136 may laterally wrap, extend, or coil around winding 134. The conductive material of winding 128 may overlap the conductive material of windings 139 and 136 (e.g., when viewed in the −Z direction). The conductive material of winding 130 may overlap the conductive material of windings 132 and 134 (e.g., when viewed in the −Z direction).

Winding 139 may form signal path 68 of reconfigurable signal coupler 56. As such, input node 60 of reconfigurable signal coupler 56 may be coupled to an end of winding 139. The example of FIG. 9 is illustrative and, if desired, signal path 68 may include more than one winding 139 in metallization layer 138-2 and/or may include part of one winding, one winding, or more than one winding in metallization layer 138-1, metallization layer 138-2, and/or additional metallization layers of substrate 122.

Windings 128, 130, 132, 134, and 136 may be coupled in series between the coupled node and the isolated node of reconfigurable signal coupler 56. Conductive vias 140 extending through substrate 122 (e.g., between metallization layers 138) may couple windings in different metallization layers together. Windings 128, 130, 132, 134, and 136 may collectively form coupled path 71 of reconfigurable signal coupler 56. For example, windings 128, 130, 132, and 134 may collectively form conductor 70 (FIGS. 4-7) whereas winding 136 may form conductor 72 of reconfigurable signal coupler 56.

Terminal 74 of conductor 70 may be coupled to a first end of winding 128. Winding 128 may extend from the first end to a second end that is coupled to a first end of winding 130. Winding 130 may extend from the first end to a second end. The second end of winding 130 may be coupled to a first end of winding 132 over a corresponding conductive via 140. Winding 132 may extend from the first end to a second end.

The second end of winding 132 may be coupled to a first end of winding 134 over a corresponding conductive via 140. Winding 134 may extend from the first end to an opposing second end. The second end of winding 134 (e.g., terminal 76 of FIGS. 4-7) may be coupled to a first end of winding 136 by switch 82 of FIGS. 4-7 (e.g., at terminal 78). Winding 136 may extend from the first end to an opposing second end (e.g., terminal 80 of FIGS. 4-7). The second end of winding 136 may be coupled to coupled node 64 (FIGS. 6 and 7) or isolated node 66 (FIGS. 4 and 5). Windings 128-136 may collectively implement coupled path 71 as a reconfigurable multilayer three-dimensional solenoid structure, for example.

The example of FIG. 9 is illustrative and non-limiting. Coupled path 71 may include more than two windings in metallization layer 138-1, may include more than one winding in metallization layer 138-2, may include more than two windings in metallization layer 138-3, and/or may include additional windings in additional metallization layers. Conductors 70 and 72 may be distributed across windings 128, 130, 132, 134, and 136 in any desired manner.

Winding 139 may be vertically interposed between windings 128 and 136 to form a first vertical stack (column) 137 of windings. Windings 130, 132, and 134 may form a second vertical stack 135 of windings adjacent stack 137 (e.g., where the windings in stack 137 laterally surround the windings in stack 135). The windings of coupled path 71 may be coupled together in a manner that configures current to flow in the same direction through each of the windings in stacks 137 and 135 (e.g., into the plane of the page of FIG. 9 as shown by arrows 126). This prevents current on different windings in coupled path 71 from canceling each other out and preventing the coupling of radio-frequency signals from the signal path onto the coupled path.

Sandwiching signal path 68 between windings 128 and 136 and placing signal path 68 laterally next to stack 135 may serve to maximize the amount of electromagnetic coupling between signal path 68 and coupled path 71. While reconfigurable signal coupler 56 is operated in its high coupling mode, the electromagnetic coupling may include a first vertical capacitive coupling between windings 139 and 128, a second vertical capacitive coupling between windings 139 and 136, and additional lateral capacitive couplings between winding 139 and the windings in stack 135, for example. When reconfigurable signal coupler 56 is operated in its low coupling mode, windings 128-134 and thus conductor 70 are switched out of use such that radio-frequency signals are only coupled off of winding 139 onto winding 136.

Metallization layers 138-1, 138-2, and 138-3 may be consecutive metallization layers of substrate 122 or, if desired, one or more metallization layers of substrate 122 may be interposed between metallization layers 138-2 and 138-3 and/or between metallization layers 138-1 and 138-2. Metallization layers 138-3, 138-2, and 138-1 may be formed from the same conductive material or, if desired, two or more of metallization layers 138-1, 138-2, and 138-3 may be formed from different conductive materials.

Figure 10:
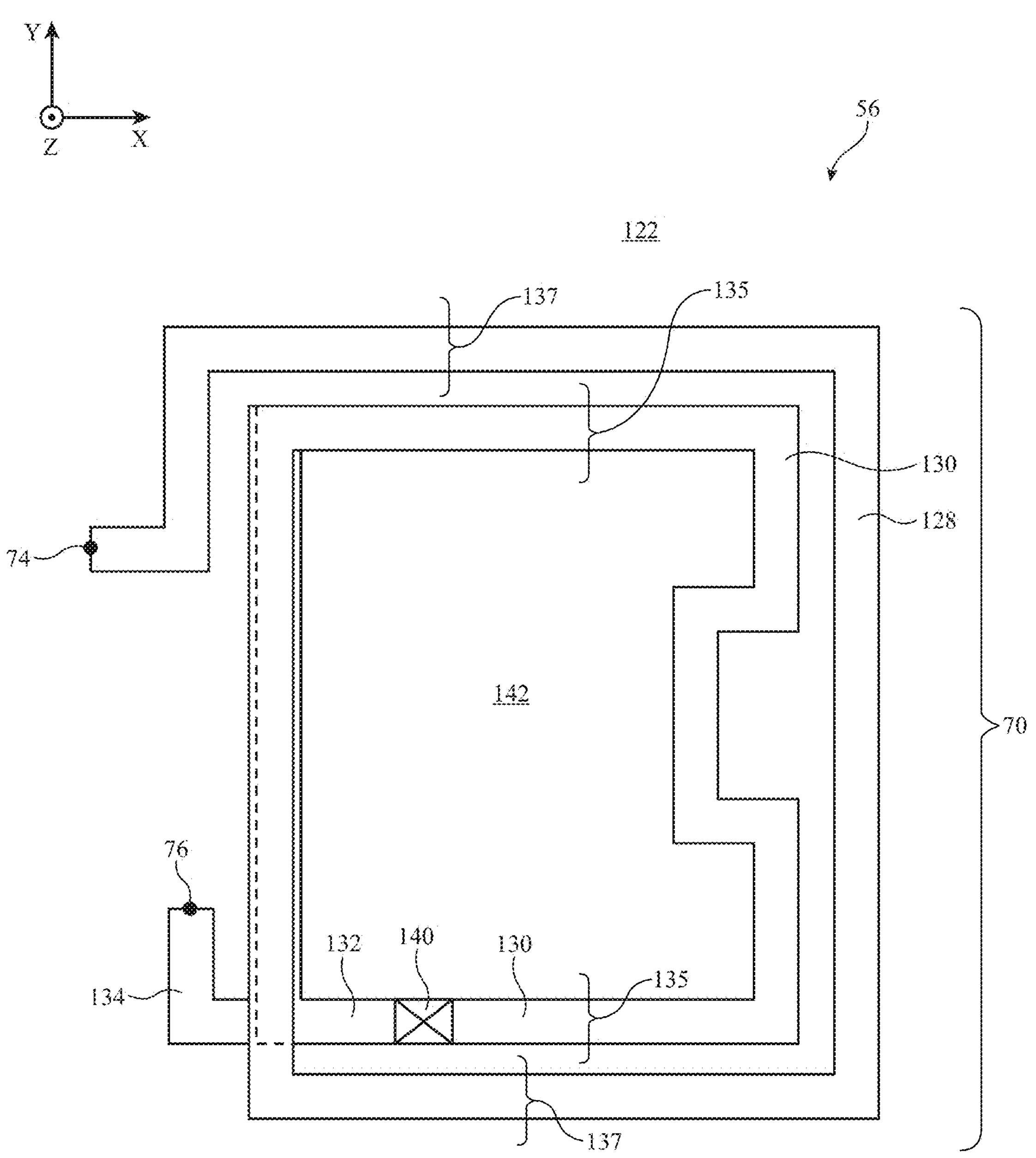
FIG. 10 is a layout diagram of a first conductive layer in an illustrative reconfigurable signal coupler in accordance with some embodiments.

FIG. 10 is a layout diagram showing one example of how windings 128 and 130 of conductor 70 may be formed in metallization layer 138-1. As shown in FIG. 10, winding 130 may laterally surround a central opening 142 of all the windings in reconfigurable signal coupler 56. Winding 128 may laterally surround winding 130. Winding 128 may have a first end coupled to terminal 74 (e.g., at the first end of conductor 70). Terminal 74 may be coupled to impedance termination Z1 (FIGS. 6 and 7) or switch 86 (FIGS. 4 and 5).

Winding 128 may extend around central opening 142 and winding 130 to a second end of winding 128. Winding 130 may have a first end coupled to the second end of winding 128. Winding 130 may extend around central opening 142 from its first end to a second end of winding 130 at conductive via 140. Conductive via 140 may couple the second end of winding 130 in metallization layer 138-1 (FIG. 9) to a first end of winding 132 in metallization layer 138-2 (FIG. 9). Winding 132 may extend around central opening 142 overlapping winding 130 and may be coupled to the underlying winding 134 in metallization layer 138-3 (FIG. 9) by an additional conductive via. Terminal 76 of conductor 70 may be coupled to the end of winding 134 in metallization layer 138-3. Terminal 76 on winding 134 may be coupled to terminal 78 of conductor 72 in metallization layer 138-3 (e.g., winding 136 of FIG. 9) by switch 82 (FIGS. 4-7). Windings 130, 132, and 134 may overlap each other to form vertical stack 135. Winding 128 may overlap winding 139 and winding 136 (FIG. 9) to form vertical stack 137.

Figure 11:
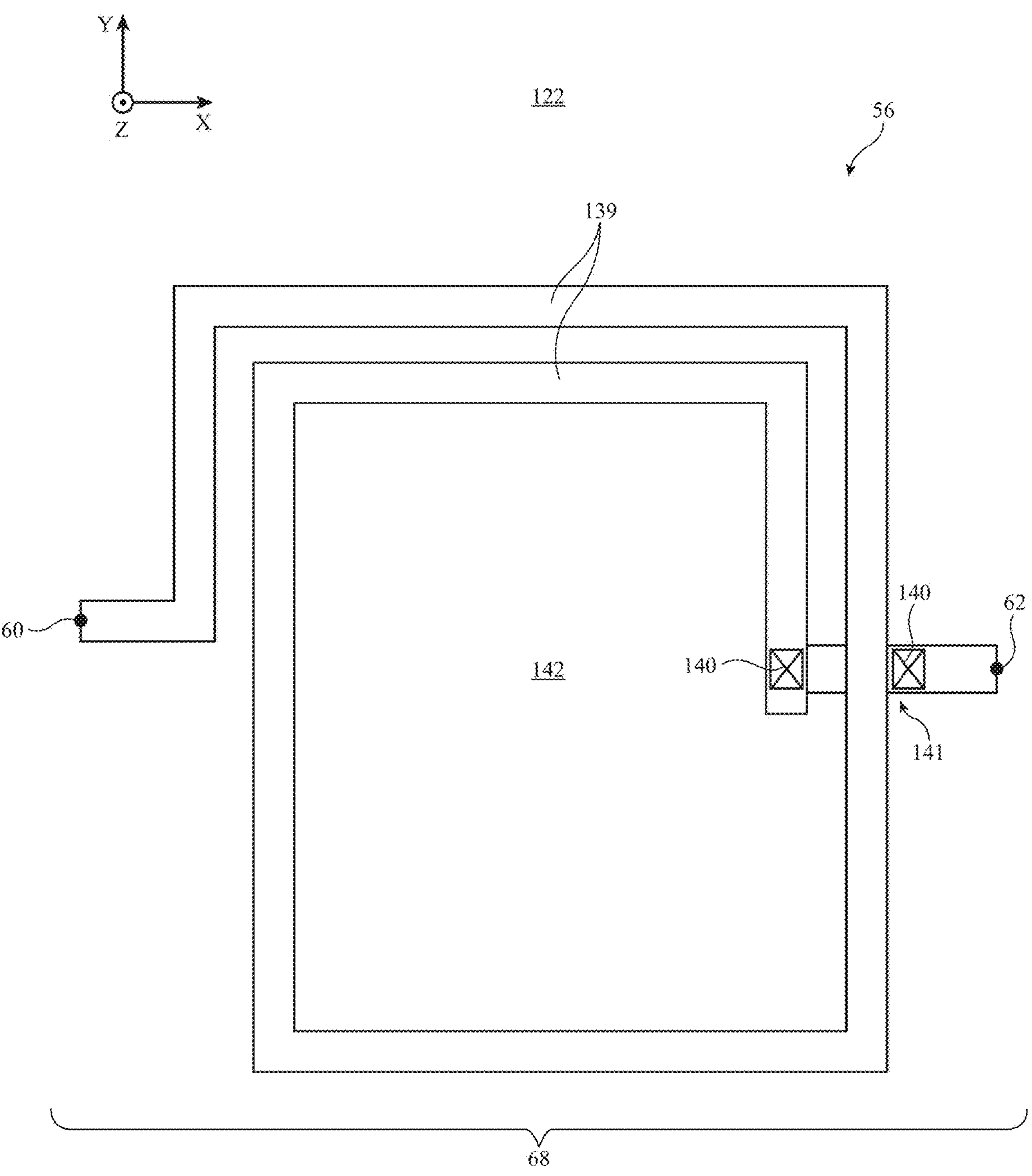
FIG. 11 is a layout diagram of a second conductive layer in an illustrative reconfigurable signal coupler in accordance with some embodiments.

FIG. 11 is a layout diagram showing one example of how winding 139 of signal path 68 may be formed in metallization layer 138-2 of FIG. 9. In the example of FIG. 11, winding 132 from stack 135 of FIG. 9 has been omitted for the sake of clarity. As shown in FIG. 11, winding 139 may extend from its first end at input node 60 to its second end at output node 62 around central opening 142. In the example of FIG. 11, signal path 68 includes one and a half turns of winding 139. If desired, conductive vias 140 may be used to form one or more crossovers such as crossover 141 to accommodate more than one turn of winding 139. Winding 139 may laterally surround winding 132 of FIG. 9 (not shown in FIG. 11) and may vertically overlap windings 128 and 136 in stack 137 (FIG. 9) to maximize the amount of coupling between signal path 68 and coupled path 71.

Figure 12:
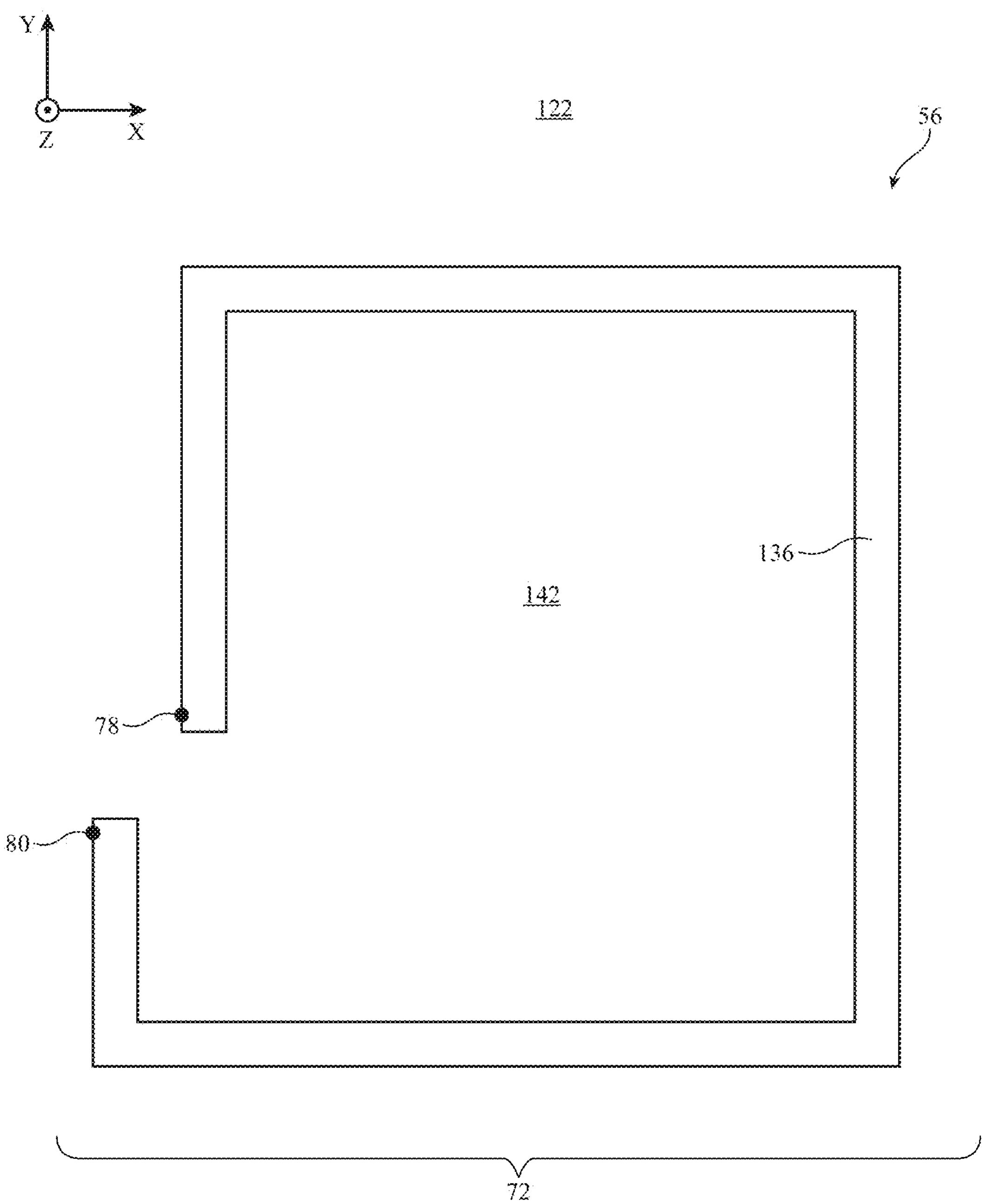
FIG. 12 is a layout diagram of a third conductive layer in an illustrative reconfigurable signal coupler in accordance with some embodiments.

FIG. 12 is a layout diagram showing one example of how winding 136 of conductor 72 may be formed in metallization layer 138-3 of FIG. 9. In the example of FIG. 12, winding 134 from stack 135 of FIG. 9 has been omitted for the sake of clarity. As shown in FIG. 12, winding 136 may extend from a first end at terminal 78 to a second end at terminal 80 around central opening 142. Winding 136 may laterally surround winding 134 of FIGS. 9 and 10 (not shown in FIG. 11) and may vertically overlap windings 139 and 128 in stack 135. Terminal 78 may be coupled to terminal 76 on winding 134 (FIG. 10) by switch 82 (FIGS. 4-7). Placing both terminal 78 of winding 136 and terminal 76 of winding 10 at the same side of the signal coupler may help to facilitate placement of switch 82 on substrate 122. Placing both terminal 78 and terminal 74 on the same side of the signal coupler may help to minimize routing complexity to the coupled node (e.g., with minimal physical layout constraints). Terminal 80 may be coupled to isolated node 66 (FIGS. 4 and 5) or coupled node 64 (FIGS. 6 and 7).

When implemented in this way, reconfigurable signal coupler 56 may exhibit a very high level of electromagnetic coupling between the coupled path and the signal path while also being reconfigurable to adjust coupling factor while consuming a minimal amount of area on substrate 122. The examples of FIGS. 10-12 are illustrative and non-limiting. Conductor 70 may include any desired number of windings in any desired number of metallization layers. Conductor 72 may include any desired number of windings in any desired number of metallization layers. Signal path 68 may include any desired number of windings in any desired number of layers. Windings 128-136 and 139 may have any desired shapes with any desired number of straight and/or curved segments extending at any desired angles with respect to each other and having any desired number of curved and/or straight edges.

Figure 13:
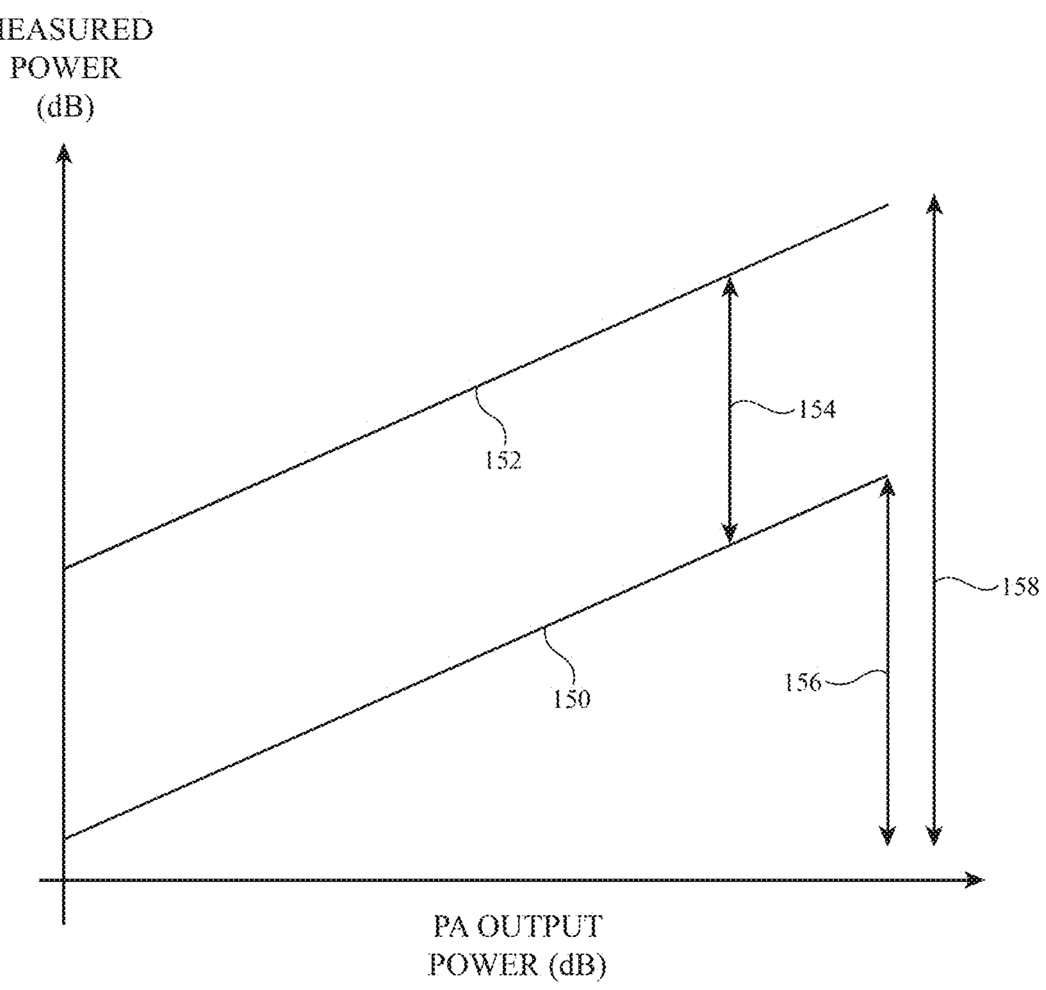
FIG. 13 is a plot showing how an illustrative reconfigurable signal coupler may exhibit higher dynamic range for measuring power levels of a radio-frequency signal than a fixed signal coupler in accordance with some embodiments.

FIG. 13 plots, as a function of the output power level of signal source 54 of FIG. 3 (e.g., a power amplifier (PA)), the measured power of the radio-frequency signal on signal path 68 as measured by measurement circuitry 58 using reconfigurable signal coupler 56. Curve 150 plots measured power while reconfigurable signal coupler 56 is in the low coupling mode. Curve 152 plots measured power while reconfigurable signal coupler 56 is in the high coupling mode.

While in the low power mode, the measurement circuitry measures power within range 156. By switching reconfigurable signal coupler 56 to the high coupling mode, the measurement circuitry can extend the power levels measured using reconfigurable signal coupler 56 by margin 154 (e.g., linearly extending the power detection range of the measurement circuitry without nonlinear effects). By switching between the high and low coupling modes over time as needed (e.g., based on the output power level of the signal source), the measurement circuitry can measure power level over a total effective dynamic range 158 (e.g., to as high as 30 dB or greater) that is much wider than in implementations where a fixed signal coupler is used. Curves 150 and 152 may have other shapes in practice.

Switching reconfigurable signal coupler 56 from the high coupling mode to the low coupling mode may reduce the coupling factor between signal path 68 and coupled path 71 by as much as 5-10 dB or more, for example. Switching reconfigurable signal coupler 56 may exhibit a low insertion loss (e.g., less than 0.5 dB) in both the high and low coupling modes (e.g., due to the absence of switches on signal path 68). The low coupling mode may introduce slightly less insertion loss in some situations. Impedance termination Z2 may have a lower impedance than impedance termination Z1 (FIGS. 4-7). As one example, impedance termination Z1 of FIGS. 4 and 5 may be approximately 25-35 Ohms and impedance termination Z2 of FIGS. 4 and 5 may be approximately 5-15 Ohms. As another example, impedance termination Z1 of FIGS. 6 and 7 may be approximately 32-35 Ohms and impedance termination Z2 of FIGS. 6 and 7 may be approximately 28-32 Ohms. Measuring power level using reconfigurable signal coupler 56 may produce less measurement error (e.g., by as much as 3 dB or greater) than implementations where a power detector directly connected to radio-frequency transmission line path 36 is used to measure power.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

The methods and operations described above may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

For one or more aspects, at least one of the components set forth in one or more of the preceding figures may be configured to perform one or more operations, techniques, processes, or methods as set forth in the example section below.

EXAMPLES

In the following sections, further exemplary aspects are provided.

Example 1 includes circuitry including: a signal source; an output node; a transmission line coupled between the signal source and the output node; a signal coupler disposed on the transmission line, wherein the signal coupler has a coupled node and an isolated node and includes a signal path in the transmission line, first and second conductors extending along the signal path, a first switch that couples the first conductor to the second conductor, and a second switch that couples the first and second conductors to the coupled node; and measurement circuitry communicatively coupled to the coupled node and configured to measure a radio-frequency signal on the transmission line using the signal coupler.

Example 2 includes the circuitry of example 1, wherein the first conductor extends from a first end to a second end opposite the first end, the second conductor extends from a third end to a fourth end opposite the third end, the second switch couples the coupled node to a first terminal at the first end of the first conductor, and the second switch couples the coupled node to a second terminal at the third end of the second conductor.

Example 3 includes the circuitry of example 2, wherein the first switch couples a third terminal at the second end of the first conductor to the second terminal at the third end of the second conductor.

Example 4 includes the circuitry of example 3, wherein the isolated node is coupled to a fourth terminal at the fourth end of the second conductor.

Example 5 includes the circuitry of example 4, further including: a first impedance termination; a second impedance termination different than the first impedance termination; and a third switch that couples the isolated node to the first and second impedance terminations.

Example 6 includes the circuitry of example 5, wherein the first switch includes a single-pole single-throw switch, the second switch includes a first single-pole double-throw (SPDT) switch, and the third switch includes a second SPDT switch.

Example 7 includes the circuitry of example 5, further including: one or more processors configured to adjust a coupling factor of the signal coupler by adjusting the first, second, and third switches.

Example 8 includes the circuitry of example 1, further including: a substrate having at least first, second, and third metallization layers, wherein the signal path includes a first winding of conductive traces on the second metallization layer.

Example 9 includes the circuitry of example 8, wherein the first conductor includes a second winding of conductive traces on the first metallization layer, the second winding overlaps the first winding, the second conductor includes a third winding of conductive traces on the third metallization layer, and the third winding overlaps the first and second windings.

Example 10 includes the circuitry of example 9, wherein the first conductor further includes: a fourth winding of conductive traces on the first metallization layer; a fifth winding of conductive traces on the second metallization layer; and a sixth winding of conductive traces on the third metallization layer.

Example 11 includes the circuitry of example 10, wherein the first winding laterally extends around the fifth winding, the second winding laterally extends around the fourth winding, the third winding laterally extends around the sixth winding, and current flows in a same direction through the second, third, fourth, fifth and sixth windings.

Example 12 includes the circuitry of example 1, further including: one or more processors configured to adjust the first and second switches between a first switch state and a second switch state, wherein the first and second conductors form a coupled path for the signal coupler and are electromagnetically coupled to the signal path while the first and second switches are in the first switch state, and the second conductor forms the coupled path for the signal coupler and is electromagnetically coupled to the signal path while the first and second switches are in the second switch state.

Example 13 includes a signal coupler disposed on a substrate and including: a signal path that includes a first winding in a first metallization layer of the substrate, the first winding being coupled between input and output nodes of the signal coupler; a coupled path that is electromagnetically coupled to the signal path and that includes a second winding in a second metallization layer of the substrate and overlapping the first winding, a third winding in the first metallization layer, the first winding laterally extending around the third winding, and a fourth winding in a third metallization layer of the substrate and overlapping the first and second windings; and a switch that couples a coupled node of the signal conductor to a first terminal on the second winding and a second terminal on the fourth winding.

Example 14 includes the signal coupler of example 13, the coupled path further including: a fifth winding in the third metallization layer and overlapping the third winding, wherein the fourth winding laterally extends around the fifth winding.

Example 15 includes the signal coupler of example 14, further including: an additional switch that couples a third terminal on the fourth winding to a fourth terminal on the fifth winding.

Example 16 includes the signal coupler of example 14, the coupled path further including: a sixth winding in the first metallization layer and overlapping the third and fifth windings, wherein the second winding laterally extends around the sixth winding.

Example 17 includes the signal coupler of example 16, wherein the sixth, third, fifth, and fourth windings are coupled in series between the first terminal on the second winding and an isolated node of the signal coupler.

Example 18 includes a method of operating wireless circuitry including: transmitting a signal along a signal path of a signal coupler, the signal coupler including first and second conductors coextensive with the signal path; placing the signal coupler in a first state by adjusting first and second switches to configure the first and second conductors to form a coupled path of the signal coupler, the first switch coupling the first conductor to the second conductor, and the second switch coupling the first and second conductors to a coupled node of the signal conductor; passing, using the first and second conductors, a first portion of the signal to a power detector while the signal coupler is in the first state; placing the signal coupler in a second state by adjusting the first and second switches to remove the first conductor from the coupled path; passing, using the second conductor, a second portion of the signal to the power detector while the signal coupler is in the second state; and measuring, using the power detector, power levels of the first and second portions of the signal.

Example 19 includes the method of example 18, wherein the first conductor does not form part of the coupled path while the signal coupler is in the second state.

Example 20 includes the method of example 18, further including: coupling, using a third switch, the second conductor to a first impedance termination while the signal coupler is in the first state; and coupling, using the third switch, the second conductor to a second impedance termination while the signal coupler is in the second state.

Example 21 includes circuitry including: a signal source; an output node; a transmission line coupled between the signal source and the output node; a signal coupler disposed on the transmission line, wherein the signal coupler has a coupled node and includes a signal path in the transmission line; first and second conductors extending along the signal path, wherein the second conductor is coupled to the coupled node, a first switch that couples the first conductor to the second conductor, a first impedance termination coupled to the first conductor, a second impedance termination, and a second switch that couples the second impedance termination to the second conductor; and measurement circuitry communicatively coupled to the coupled node and configured to measure a radio-frequency signal on the transmission line using the signal coupler.

Example 22 includes the circuitry of example 21, wherein the first conductor extends from a first end to a second end opposite the first end, the second conductor extends from a third end to a fourth end opposite the third end, and the first impedance termination is coupled to a first terminal at the first end of the first conductor.

Example 23 includes the circuitry of example 22, wherein the first switch couples a second terminal at the second end of the first conductor to a third terminal at the third end of the second conductor.

Example 24 includes the circuitry of example 23, wherein the second switch couples the second impedance termination to the third end of the third conductor.

Example 25 includes the circuitry of example 24, wherein the coupled node is coupled to a fourth terminal at the fourth end of the second conductor.

Example 26 includes the circuitry of example 25, wherein the first conductor is coupled in series between the first impedance termination and the first switch, the first switch is coupled in series between the first and second conductors, and the second conductor is coupled in series between the first switch and the coupled node.

Example 27 includes the circuitry of example 26, wherein the first switch includes a first single-pole single-throw (SPST) switch and the second switch includes a second SPST switch.

Example 28 includes the circuitry of example 21, further including: one or more processors configured to adjust a coupling factor of the signal coupler by adjusting the first and second switches.

Example 29 includes the circuitry of example 21, further including: a substrate having at least first, second, and third metallization layers, wherein the signal path includes a first winding of conductive traces on the second metallization layer.

Example 30 includes the circuitry of example 29, wherein the first conductor includes a second winding of conductive traces on the first metallization layer, the second winding overlaps the first winding, the second conductor includes a third winding of conductive traces on the third metallization layer, and the third winding overlaps the first and second windings.

Example 31 includes the circuitry of example 30, wherein the first conductor further includes: a fourth winding of conductive traces on the first metallization layer; a fifth winding of conductive traces on the second metallization layer; and a sixth winding of conductive traces on the third metallization layer, wherein the first winding laterally extends around the fifth winding, the second winding laterally extends around the fourth winding, the third winding laterally extends around the sixth winding, and current flows in a same direction through the second, third, fourth, fifth and sixth windings.

Example 32 includes the circuitry of example 31, further including: one or more processors configured to adjust the first and second switches between a first switch state and a second switch state, wherein in the first switch state, the first switch is closed and the second switch is open, in the second switch state, the first switch is open and the second switch is closed, the first and second conductors form a coupled path for the signal coupler and are electromagnetically coupled to the signal path while the first and second switches are in the first switch state, and the second conductor forms the coupled path for the signal coupler and is electromagnetically coupled to the signal path while the first and second switches are in the second switch state.

Example 33 includes a signal coupler disposed on a substrate and including: a signal path that includes a first winding in a first metallization layer of the substrate, the first winding being coupled between input and output nodes of the signal coupler; a coupled path that is electromagnetically coupled to the signal path and that includes a second winding in a second metallization layer of the substrate and overlapping the first winding, a third winding in the first metallization layer, the first winding laterally extending around the third winding, and a fourth winding in a third metallization layer of the substrate and overlapping the first and second windings; an impedance termination; and a switch that couples the fourth winding to the impedance termination, the fourth winding being coupled in series between the switch and a coupled node of the signal conductor.

Example 34 includes the signal coupler of example 33, the coupled path further including: a fifth winding in the third metallization layer and overlapping the third winding, wherein the fourth winding laterally extends around the fifth winding.

Example 35 includes the signal coupler of example 34, further including: an additional switch that couples the fourth winding to the fifth winding, the fourth winding being coupled in series between the additional switch and the coupled node.

Example 36 includes the signal coupler of example 14, the coupled path further including: a sixth winding in the first metallization layer and overlapping the third and fifth windings, wherein the second winding laterally extends around the sixth winding.

Example 37 includes the signal coupler of example 16, further including: an additional impedance termination coupled to the second winding, wherein the second, sixth, third, fifth, and fourth windings are coupled in series between the additional impedance terminal and the coupled node.

Example 38 includes a method of operating wireless circuitry including: transmitting a signal along a signal path of a signal coupler, the signal coupler including first and second conductors coextensive with the signal path; placing the signal coupler in a first state by adjusting first and second switches to configure the first and second conductors to form a coupled path of the signal coupler, wherein the first switch couples the first conductor to the second conductor, the second conductor is coupled in series between the first switch and a coupled node of the signal conductor, the second switch couples a first impedance termination to the second conductor, and the first conductor is coupled to a second impedance termination; passing, using the first and second conductors, a first portion of the signal to a power detector while the signal coupler is in the first state; placing the signal coupler in a second state by adjusting the first and second switches to remove the first conductor from the coupled path; passing, using the second conductor, a second portion of the signal to the power detector while the signal coupler is in the second state; and measuring, using the power detector, power levels of the first and second portions of the signal.

Example 39 includes the method of example 38, wherein the first conductor does not form part of the coupled path while the signal coupler is in the second state.

Example 40 includes the method of example 38, wherein: the first switch is closed and the second switch is open while the signal coupler is in the first switch state; and the first switch is open and the second switch is closed while the signal coupler is in the second switch state.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is illustrative and various modifications can be made to the described embodiments. The foregoing embodiments may be implemented individually or in any combination.

What is claimed is:

1. Circuitry comprising:

a signal source;

an output node;

a transmission line coupled between the signal source and the output node;

a signal coupler disposed on the transmission line, wherein the signal coupler has a coupled node and an isolated node and includes a signal path in the transmission line, first and second conductors extending along the signal path, the first conductor extending from a first end to a second end opposite the first end, and the second conductor extending from a third end to a fourth end opposite the third end, a first switch that couples the first conductor to the second conductor, and a second switch that couples the coupled node to a first terminal at the first end of the first conductor and that couples the coupled node to a second terminal at the third end of the second conductor; and measurement circuitry communicatively coupled with the coupled node and configured to measure a radio-frequency signal on the transmission line using the signal coupler.

2. The circuitry of claim 1, wherein the first switch couples a third terminal at the second end of the first conductor to the second terminal at the third end of the second conductor.

3. The circuitry of claim 2, wherein the isolated node is coupled to a fourth terminal at the fourth end of the second conductor.

4. The circuitry of claim 3, further comprising:

a first impedance termination;

a second impedance termination different than the first impedance termination; and a third switch that couples the isolated node to the first and second impedance terminations.

5. The circuitry of claim 4, wherein the first switch comprises a single-pole single-throw switch, the second switch comprises a first single-pole double-throw (SPDT) switch, and the third switch comprises a second SPDT switch.

6. The circuitry of claim 4, further comprising:

one or more processors configured to adjust a coupling factor of the signal coupler by adjusting the first, second, and third switches.

7. The circuitry of claim 1, further comprising:

a substrate having at least first, second, and third metallization layers, wherein the signal path comprises a first winding of conductive traces on the second metallization layer.

8. The circuitry of claim 7, wherein the first conductor comprises a second winding of conductive traces on the first metallization layer, the second winding overlaps the first winding, the second conductor comprises a third winding of conductive traces on the third metallization layer, and the third winding overlaps the first and second windings.

9. The circuitry of claim 8, wherein the first conductor further comprises:

a fourth winding of conductive traces on the first metallization layer;

a fifth winding of conductive traces on the second metallization layer; and a sixth winding of conductive traces on the third metallization layer.

10. The circuitry of claim 9, wherein the first winding laterally extends around the fifth winding, the second winding laterally extends around the fourth winding, the third winding laterally extends around the sixth winding, and current flows in a same direction through the second, third, fourth, fifth and sixth windings.

11. The circuitry of claim 1, further comprising:

one or more processors configured to adjust the first and second switches between a first switch state and a second switch state, wherein the first and second conductors form a coupled path for the signal coupler and are electromagnetically coupled to the signal path while the first and second switches are in the first switch state, and the second conductor forms the coupled path for the signal coupler and is electromagnetically coupled to the signal path while the first and second switches are in the second switch state.

12. The circuitry of claim 1, further comprising a substrate, wherein the signal path comprises a winding of conductive traces in a metallization layer of the substrate.

13. A signal coupler disposed on a substrate and comprising:

a signal path that includes a first winding in a first metallization layer of the substrate, the first winding being coupled between input and output nodes of the signal coupler;

a coupled path that is electromagnetically coupled to the signal path and that includes a second winding in a second metallization layer of the substrate and overlapping the first winding, a third winding in the first metallization layer, the first winding laterally extending around the third winding, and a fourth winding in a third metallization layer of the substrate and overlapping the first and second windings; and a switch that couples a coupled node of the signal coupler to a first terminal on the second winding and a second terminal on the fourth winding.

14. The signal coupler of claim 13, the coupled path further comprising:

a fifth winding in the third metallization layer and overlapping the third winding, wherein the fourth winding laterally extends around the fifth winding.

15. The signal coupler of claim 14, further comprising:

an additional switch that couples a third terminal on the fourth winding to a fourth terminal on the fifth winding.

16. The signal coupler of claim 14, the coupled path further comprising:

a sixth winding in the first metallization layer and overlapping the third and fifth windings, wherein the second winding laterally extends around the sixth winding.

17. The signal coupler of claim 16, wherein the sixth, third, fifth, and fourth windings are coupled in series between the first terminal on the second winding and an isolated node of the signal coupler.

18. A method of operating wireless circuitry comprising:

transmitting a signal along a signal path of a signal coupler, the signal coupler including first and second conductors coextensive with the signal path;

placing the signal coupler in a first state by adjusting first and second switches to configure the first and second conductors to form a coupled path of the signal coupler, the first switch coupling the first conductor to the second conductor, and the second switch coupling the first and second conductors to a coupled node of the signal coupler;

passing, using the first and second conductors, a first portion of the signal to a power detector while the signal coupler is in the first state;

placing the signal coupler in a second state by adjusting the first and second switches to remove the first conductor from the coupled path;

passing, using the second conductor, a second portion of the signal to the power detector while the signal coupler is in the second state; and measuring, using the power detector, power levels of the first and second portions of the signal.

19. The method of claim 18, wherein the first conductor does not form part of the coupled path while the signal coupler is in the second state.

20. The method of claim 18, further comprising:

coupling, using a third switch, the second conductor to a first impedance termination while the signal coupler is in the first state; and coupling, using the third switch, the second conductor to a second impedance termination while the signal coupler is in the second state.

* * * * *